(12) United States Patent
Chen et al.

(10) Patent No.: US 7,644,863 B2
(45) Date of Patent: Jan. 12, 2010

(54) AGENT USING DETAILED PREDICTIVE MODEL

(75) Inventors: Ye Chen, Sunnyvale, CA (US); Alexander Renz, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1533 days.

(21) Appl. No.: 10/281,074

(22) Filed: Oct. 24, 2002

(65) Prior Publication Data

US 2003/0126103 A1 Jul. 3, 2003

Related U.S. Application Data

(60) Provisional application No. 60/336,227, filed on Nov. 14, 2001, provisional application No. 60/384,638, filed on May 31, 2002.

(51) Int. Cl.
*G06F 19/00* (2006.01)
(52) U.S. Cl. .................. 235/385; 700/106; 705/28
(58) Field of Classification Search ............ 705/28, 705/7, 10, 22, 29; 235/375, 383, 385; 700/106
See application file for complete search history.

(56) References Cited

U.S. PATENT DOCUMENTS

| | | | | |
|---|---|---|---|---|
| 5,285,494 A * | 2/1994 | Sprecher et al. | ............ | 455/423 |
| 5,446,890 A * | 8/1995 | Renslo et al. | ............ | 707/104.1 |
| 5,615,109 A | 3/1997 | Eder | | |
| 5,819,232 A * | 10/1998 | Shipman | ............ | 705/8 |
| 5,870,735 A * | 2/1999 | Agrawal et al. | ............ | 707/3 |
| 5,946,662 A * | 8/1999 | Ettl et al. | ............ | 705/8 |
| 5,963,919 A * | 10/1999 | Brinkley et al. | ............ | 705/28 |
| 6,006,196 A * | 12/1999 | Feigin et al. | ............ | 705/10 |
| 6,138,115 A * | 10/2000 | Agrawal et al. | ............ | 707/3 |
| 6,205,431 B1 | 3/2001 | Willemain et al. | | |
| 6,341,271 B1 * | 1/2002 | Salvo et al. | ............ | 705/28 |
| 6,408,263 B1 * | 6/2002 | Summers | ............ | 703/6 |
| 6,430,540 B1 * | 8/2002 | Guidice et al. | ............ | 705/28 |
| 6,572,318 B2 * | 6/2003 | Cobene et al. | ............ | 412/11 |
| 6,609,101 B1 | 8/2003 | Landvater | | |
| 6,622,056 B1 | 9/2003 | Lindell | | |
| 6,681,990 B2 * | 1/2004 | Vogler et al. | ............ | 235/385 |
| 6,873,979 B2 * | 3/2005 | Fishman et al. | ............ | 706/21 |
| 7,080,026 B2 * | 7/2006 | Singh et al. | ............ | 705/10 |
| 7,092,896 B2 * | 8/2006 | Delurgio et al. | ............ | 705/10 |
| 7,222,786 B2 * | 5/2007 | Renz et al. | ............ | 235/385 |
| 7,398,232 B2 * | 7/2008 | Renz et al. | ............ | 705/28 |
| 2002/0143669 A1 * | 10/2002 | Scheer | ............ | 705/28 |

\* cited by examiner

*Primary Examiner*—Andrew Joseph Rudy
(74) *Attorney, Agent, or Firm*—Blakely, Sokoloff, Taylor & Zafman, LLP

(57) ABSTRACT

Methods and apparatus, including computer program products, implementing and using techniques for monitoring and predicting various data related to an inventory. A data processing apparatus interacts with one or more business computers to obtain one of replenishment and consumption activity data related to an inventory. A model for variations in the inventory is created. The model is used to determine estimates of variation for one of currently planned replenishment activities and currently planned consumption activities. The estimates of variation are used to predict future inventory levels. A system including one or more agent computers is also described.

50 Claims, 9 Drawing Sheets

AGENT USING DETAILED PREDICTIVE MODEL

RELATED APPLICATIONS

This application claims priority based on U.S. Provisional Application Ser. No. 60/336,227 filed Nov. 14, 2001, for SCM Supply Network Planning, and U.S. Provisional Application Ser. No. 60/384,638, filed May 31, 2002, for Inventory Early Warning Agent in a Supply Chain Management System, the disclosures of which applications are incorporated here by reference in their entirety.

BACKGROUND

This invention relates to agents. Businesses need to adapt to many competitive pressures. For example, financial markets are increasingly demanding that companies use capital more efficiently; other businesses are seeking global playing fields to maintain growth and diversify risk; customers are demanding service as markets of one and forcing companies toward mass customization; and innovation cycles are continually accelerating.

These pressures on businesses are driving changes that have enormous implications for supply networks. For some companies, shrinking capital availability is forcing companies to streamline manufacturing and supply operations and build efficiencies, which are critical to the supply network. For other companies, information ubiquity is driving and facilitating globalization, which shrinks distances to markets and resources. The information ubiquity also requires levels of supply network visibility and collaboration that were not essential in traditional supply chains. Customers are armed with information about the real value of products, which is shrinking customer loyalty and requiring customer-service levels too expensive for companies that are unable to manage supply chain efficiencies. Finally, shrinkages in the time available to build and launch products are forcing companies to innovate at velocities far greater than before.

Ultimately, competitive pressures push profit margins lower. Product manufacturers must find ways to improve efficiency, thereby reducing costs, to survive in highly competitive markets. Supply chain efficiency plays a key role in improving margins and can be a determining factor in the success of manufacturers.

A supply chain is a network of facilities and distribution options that performs the functions of procuring materials, transforming the materials into semi-finished and finished products, and distributing the finished products to customers. Supply chain management ("SCM") is a business policy that aims to improve all activities along the supply chain. SCM results in improved integration and visibility within individual companies, as well as flexibility across supply and demand environments. As a result, a company's competitive position is greatly enhanced by building supply networks that are more responsive than the current sequential supply chains.

SAP AG and SAP America, Inc. provide SCM solutions for product manufacturers to help them reach their goals. Some of the SCM solutions are based on the mySAP.com e-business platform. One of the building blocks of the e-business platform is the SAP R/3 component that provides enterprise resource planning functionality. The SAP R/3 product includes a Web Application Server ("Web AS"), an R/3 core, and various R/3 extensions. The SCM Extensions of R/3 provide various planning, coordination, execution, and optimization solutions that are associated with a supply chain.

SUMMARY

In general, in one aspect, this invention provides methods and apparatus, including computer program products, implementing and using techniques for monitoring and predicting various data related to an inventory. A data processing apparatus interacts with one or more business computers to obtain one of replenishment and consumption activity data related to an inventory. A model for variations in the inventory is created. The model is used to determine estimates of variation for one of currently planned replenishment activities and currently planned consumption activities. The estimates of variation are used to predict future inventory levels.

Advantageous implementations can include one or more of the following features. Creating a model can include applying machine learning to create the model. Using the model for variations in inventory can include using an algorithm including a decision tree. Using the algorithm including a decision tree can include using a classification and regression tree. The classification and regression tree can be constructed using a growing stage and a pruning stage to provide one or more splitting points. The growing stage can include instructions for recursively splitting data using a criterion for maximizing the information resulting from each of the one or more splitting points.

The pruning stage can include instructions for removing splitting points. The criterion for determining splitting points can include applying analysis of variance techniques. The size of the decision tree can be selected based on a process including instructions for determining a size of the data; splitting data into multiple substantially equal-sized groups; constructing multiple test decision trees, where each test decision tree includes all of the groups except for one of the groups, such that test decision trees are created in which each group is excluded once; pruning each test decision tree at one or more degrees; testing each of the test decision trees by evaluating each test decision tree with the data excluded from creating that test decision tree; selecting a degree of pruning based on a maximization of the average performance for the excluded data; and pruning the decision tree to the selected degree of pruning.

The model can include one or more of data relating to: an update number specifying how many times an activity has been updated, a creation date specifying when an activity was first planned, a current date specifying the date when information in a record was extracted from the activity, an expected date specifying a date at which the activity is expected to be fulfilled, an expected quantity specifying an amount of material required by the activity, source of an order specifying an entity making the order, demand at a source in a temporal window prior to the expected date, actual delivered quantity, actual delivery date, time spread for use with activities that are completed in more than one piece, and activity cancelled information relating to cancellation of an activity.

A model to for predicting variability on actual delivery quantity can be created. The model can include a model for predicting variability of an actual delivery date. The model can include a model for predicting an order cancellation probability. It can be determined if a qualitative shift in behavior has occurred, and if a qualitative shift in behavior has occurred data prior to the qualitative shift in behavior can be discarded and a decision tree can be created using data generated after the qualitative shift in behavior. The data can be processed based on the quantity of data. Processing the data can include sampling the data if the quantity of the data exceeds a threshold value. Processing the data can include using additional data if the quantity of the data is below a threshold value. Predicted future inventory levels can be displayed. The predicted future inventory levels can be displayed as a bicumulative display. The predicted future inventory levels can be displayed as a relative density display. An early warning agent can be included, the early warning agent having instructions to receive the predicted future inventory levels and use the predicted future inventory levels to determine whether to order additional stock for the inventory.

The data can be generated using a radio-frequency identification device. The data can be generated upon the sale of stock in an inventory. The data can be generated upon the transfer of stock in an inventory. An implementation can include one or more agents in a supply chain management system.

In general, in another aspect, this invention provides a system comprising one or more agent computers, the agent computers. The agent computers include instructions to interact with one or more business computers to obtain one of replenishment and consumption activity data related to an inventory; create a model for variations in the inventory; use the model to determine estimates of variation for one of currently planned replenishment activities and currently planned consumption activities. The estimates of variation are used to predict future inventory levels.

The details of one or more implementations of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
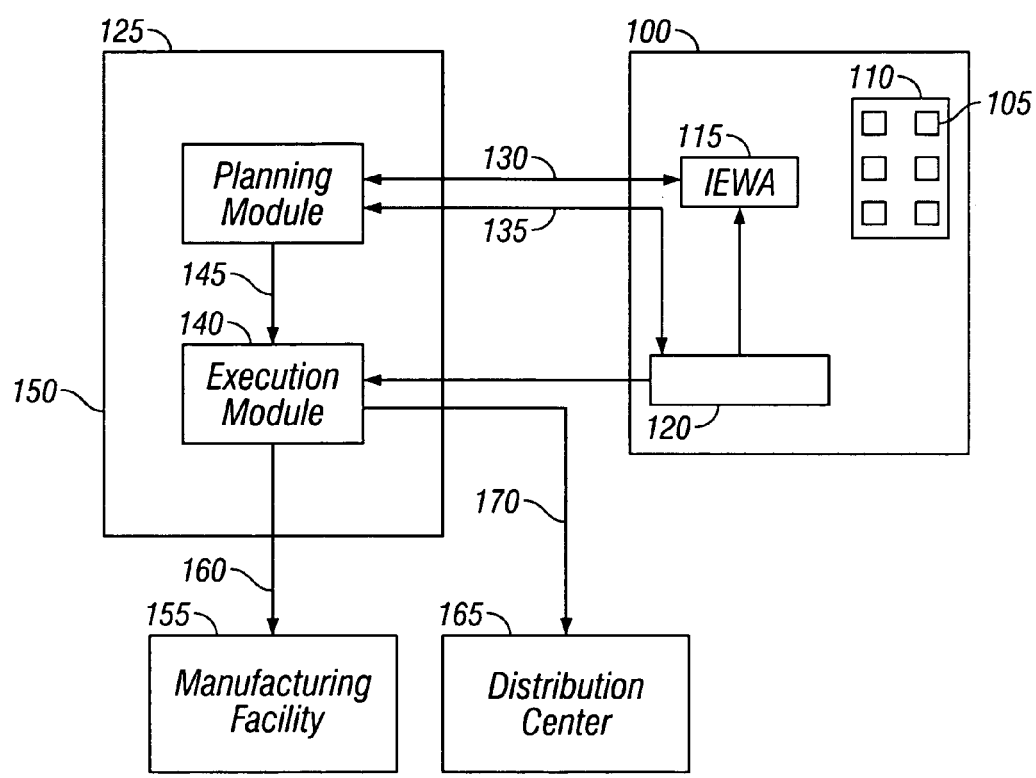
FIG. 1 is a plan view of an inventory early warning agent application to a shelf level monitoring system.

An agent is an active program that performs some high-level business functions, such as monitoring an inventory for a particular Stock Keeping Unit (SKU) for potential stock out situations and sending alerts when various thresholds are reached. For example, an agent can be programmed as an inventory early warning agent ("IEWA") that monitors one or more inventories in a factory, warehouse, store, or shelf within a store. The IEWA is programmed to monitor the inventory based on real time data that is obtained, for example, from cash registers or radio-frequency identification devices that scan information relating to an item being purchased or transferred and use that information to update the IEWA as to the level of stock on a particular shelf.

As described in more detail below, the IEWA is a predictive and adaptive inventory management application that can be used to monitor and predict future inventory levels by modeling variability in both demand and supply related supply chain activities. The IEWA uses learning techniques that can estimate potential variation in inventory levels in the near future in order to identify potentially risky situations early enough to allow for corrective measures. To provide increased effectiveness the IEWA is operated with minimal human intervention, parameter adjustment, and manual calibration. These characteristics are achieved with machine-learning techniques to recognize patterns of behavior from historical data around consumption and replenishment and around the performance of resources and supply chain partners. The IEWA can use two types of modes of operation for its predictive function: in a first mode, the detailed mode, use the IEWA predictive models built from detailed activities; and in a second mode, the aggregate mode, use the IEWA predictive models built from the aggregation of multiple activities.

In the detailed mode of operation, potential variation in inventory is estimated for each planned replenishment or consumption activity. For example, given historical performance data, the IEWA estimates whether a planned truckload of 12 ounce bottles of Bob's bottles will arrive any time within four hours prior to and six hours after the planned delivery time with a quantity that is between 95% and 100% of the requested quantity. A second stage of processing then combines the estimates of potential variation for individual activities into an estimate of the potential variation of the projected inventory levels.

In the aggregate mode of operation, potential variation of the projected inventory level is estimated directly from projected cumulative replenishment and consumption. This estimate is calculated as the aggregation of replenishment and consumption activities.

Both modes of operation provide advantages. For example, the detailed mode of operation is advantageous when low volumes of detailed data are available and when the degree of variation in activities is highly dependent on the particular resource or partner involved. The aggregate mode of operation is advantageous when it is necessary to deal with high volumes of data, or when it is difficult to track the outcome of any particular planned activity. The aggregate model is discussed below initially followed by a discussion of the detailed model. Nonetheless, the examples and descriptions of FIGS. 1-5 are equally applicable to either mode of operation.

As shown in FIG. 1, a store 100 can want to have a minimum quantity of items 105 on a shelf 110 at any particular time such that the shelf can be stocked with as large a variety of items as possible. For example, by limiting the quantity of a particular brand of tomato soup on a shelf at any particular time, a grocery store can display more brands of tomato soup on that shelf. To accomplish this type of shelving scenario, the store must carefully monitor the amount of stock on the shelf on a real time basis to prevent the shelf from emptying out. Currently, many stores use their employees to visually monitor empty space on the shelf and replenish the shelf when it looks empty. This is labor intensive and inexact. As illustrated in FIG. 1, the IEWA 115 receives shelf quantity data from a shelf-monitoring program 120 that, for example, monitors the quantity of a particular SKU number on the shelf. When an item 105 is scanned at the cash register, a database that contains the shelf location of the item is accessed and the program reduces the number of items on that shelf 110 by the number of items being purchased at that time. The IEWA 115 then uses algorithms to determine whether there is likely to be an undesirable variation in inventory and, if there will be one, when to send an order to replenish the shelf 110 with items of that particular SKU. When the quantity of items 105 on the shelf 110 reaches a certain level, the IEWA 115 sends a message to a planning module 125 along a first message path 130. The planning module 125 then sends return messages to the IEWA 115 along the first message path 130 and to the shelf-monitoring program 120 along a second message path 135. The shelf-monitoring program 120 then sends a return message to the planning module 125 along the second message path 135. The planning module 120 next sends a message to an execution module 140 along a message path 145. The planning module 125 and the execution module 140 can be components within a supply chain management application 150 or can be separate stand-alone components. After receiving the message from the planning module 125, the execution module 140 sends a first message to a manufacturing facility 155 along a message path 160 and a second message to a distributions center 165 along a message path 170. Based on this series of messages, the store is able to replenish its shelf with the item 105.

The IEWA 115 also can be used when the shelf is replenished. For example, when the shelf 105 is replenished, the shelf-monitoring program 120 sends a message to the execution module 140 along the message path 135, which sends a message to the distribution center 165 along the message path 170. These messages are used to update the distribution center of the amount of stock on the shelf 105. The distribution center can use the same IEWA or a separate IEWA to apply predictive models to the distribution center to estimate whether and when there will be an undesirable variation in inventory levels.

At another level, a store can use an IEWA to monitor the levels of an item on the shelf and in the inventory for one or more items to estimate potential undesirable variations in inventory levels. When items are sold, for example, by being scanned at a cash register, the IEWA takes that sales data and uses algorithms to determine whether there will be an undesirable variation in the inventory levels and when to send an order to replenish the shelf and/or order more of that item from a warehouse or distribution center.

At an even higher level, a warehouse or distribution center can use an IEWA to monitor the levels of an item within the warehouse, such as on shelves, on pallets, in quarantine, or at another location within the warehouse, to determine whether there will be an undesirable variation in the inventory levels and when to send an order to replenish. Customers of the warehouse, such as a retailer or a factory, order the item from the warehouse. For example, a consumer product goods ("CPG") retailer can order a pallet load of an item which the warehouse operator loads onto a delivery truck of either the warehouse, the retailer, or a third party logistics supplier. When the pallet is loaded on the truck, the warehouse operator can use a wireless communications device to notify the inventory management software that a pallet-load of a particular item has been transferred from the warehouse. Either the wireless communications device or the inventory management software can be programmed to notify the IEWA that a pallet-load of the particular item has been transferred from the warehouse. The IEWA takes that transfer data and analyzes it using algorithms to determine whether there is likely to be an undesirable variation in inventory levels and when to order addition stock of that item. One example of a framework of the IEWAs, an example of a messaging system used by the IEWAs, and the algorithms used by the IEWAs are described in more detail below.

Figure 2:
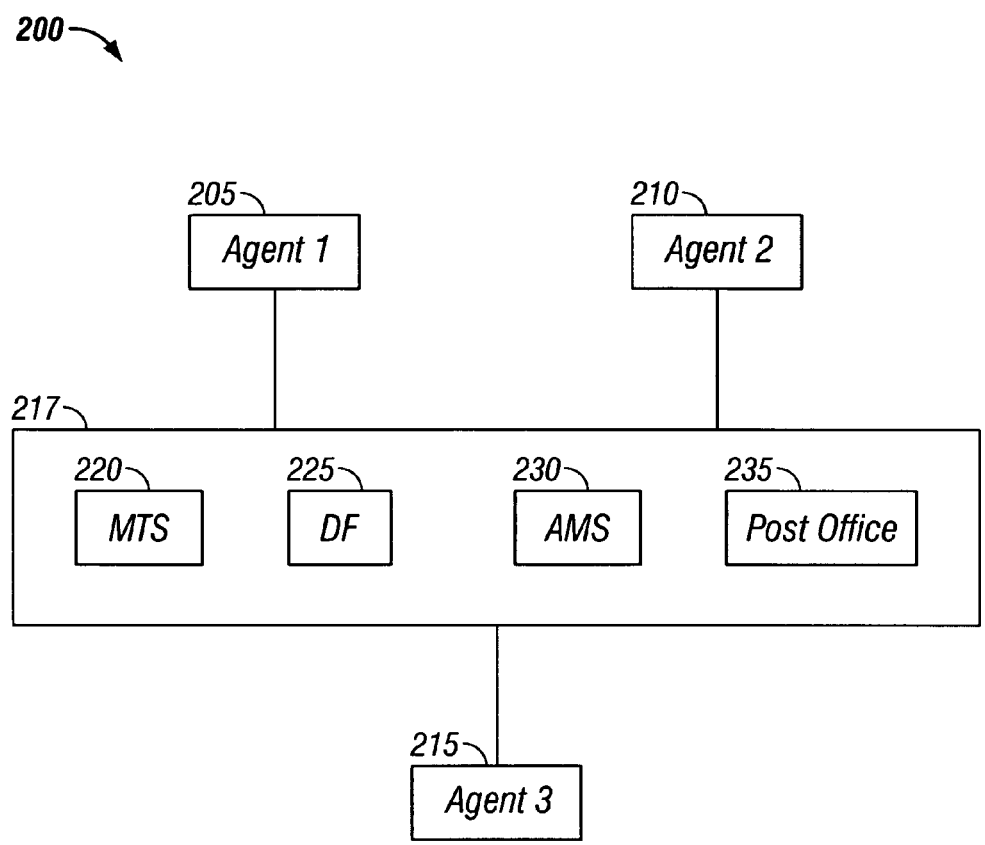
FIG. 2 is a plan view of an agent framework architecture that includes three agents.

As shown in FIG. 2, an agent framework architecture 200 includes three agents 205, 210, 215, each of which communicates with an agent framework 217 that provides frameworks services: a message transport service ("MTS") 220, a directory facilitator ("DF") 225, an agent management service 230 ("AMS"), and a Post Office 235. The agents 205, 210, 215 can be IEWAs. The agent framework 217 refers to the container that provides programmatic support for agents. In this context, agent framework 217 can be implemented in Java code that runs in a single virtual machine on a particular host. Additional services are used to support the agents running inside the framework. These additional services include life cycle management, directory services, communication, configuration, logging, persistence, and notification.

The MTS 220 is a service that is provided by a particular agent framework and allows agents to send messages, such as an AclMessage, to other agents. An AclMessage encapsulates a communication between two agents and has some characteristics in common with an email message, such as, for example, specifying a sender and recipient, having a subject, and providing message content.

The DF 225 is a service provided by a particular agent framework and provides the framework's agents with access to the central directory service. The directory service is a central service that provides identity (white page) and capability (yellow page) search facilities across an agent community. There is one directory service for one agent community. A directory service might be federated with the directory service for another agent community. An agent community is a collection of agent frameworks (and therefore agents) that collaborate to provide various business functions. A community can consist of several agent frameworks, and each framework can in turn contain several agents.

The AMS 230 is a service provided by a particular agent framework and provides agent lifecycle management facilities within the framework. The facilities allow remote management of a community of agent frameworks by essentially providing an external interface to the AMS in each agent framework. For example, the AMS allows administrators and control agents to manage the execution of other agents by stopping, starting and suspending agents. The agent framework architecture 200 also includes an administrative user interface ("AUI") that allows a system administrator to manage an agent community. The AUI uses the directory service to identify currently running agent frameworks. It then uses each framework's AMS to manage the agents within that framework.

The post office 235 is a service provided by a particular agent framework. The post office 235 receives and maintains AclMessages addressed to the agents within that framework.

Figure 3:
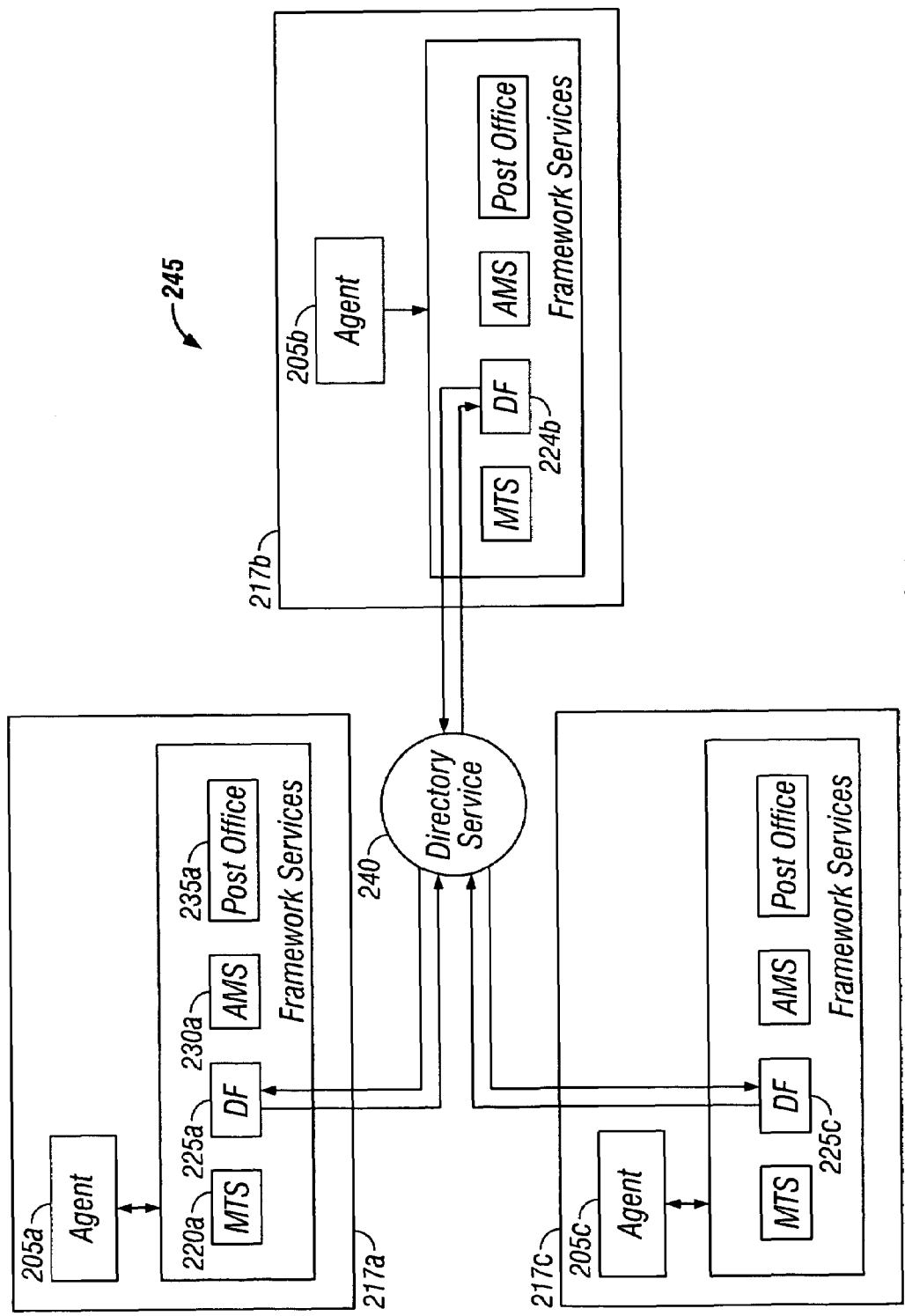
FIG. 3 is a plan view of a directory service of an agent community that includes three agent frameworks.

FIG. 3 illustrates the directory service 240 of an agent community 245 that includes three agent frameworks 217a, 217b, 217c, each of which can, for example, run on a separate host machine. The directory service 240 is a centralized service that is used to unify the agent community 245. The service can be implemented using the Java Naming and Directory Interface ("JDNI"). FIG. 3 shows only three agent frameworks 217a, 217b, 217c and, for simplicity, each agent framework contains only a single agent 205a, 205b, 205c, respectively. Nonetheless, the directory service 240 can be implemented with more agent frameworks and each agent framework can include more agents.

The directory facilitator 225 ("DF") in each agent framework 217 updates the directory service 240, registering new agents as they are started up and deregistering agents as they are shut down. The directory service 240 then allows agents to search for other agents, both by identity (for example, using a service that is analogous to a white page service) and capability (for example, using a service that is analogous to a yellow page service). The DF 225 provides access to this functionality within each agent framework 217.

Figure 4:
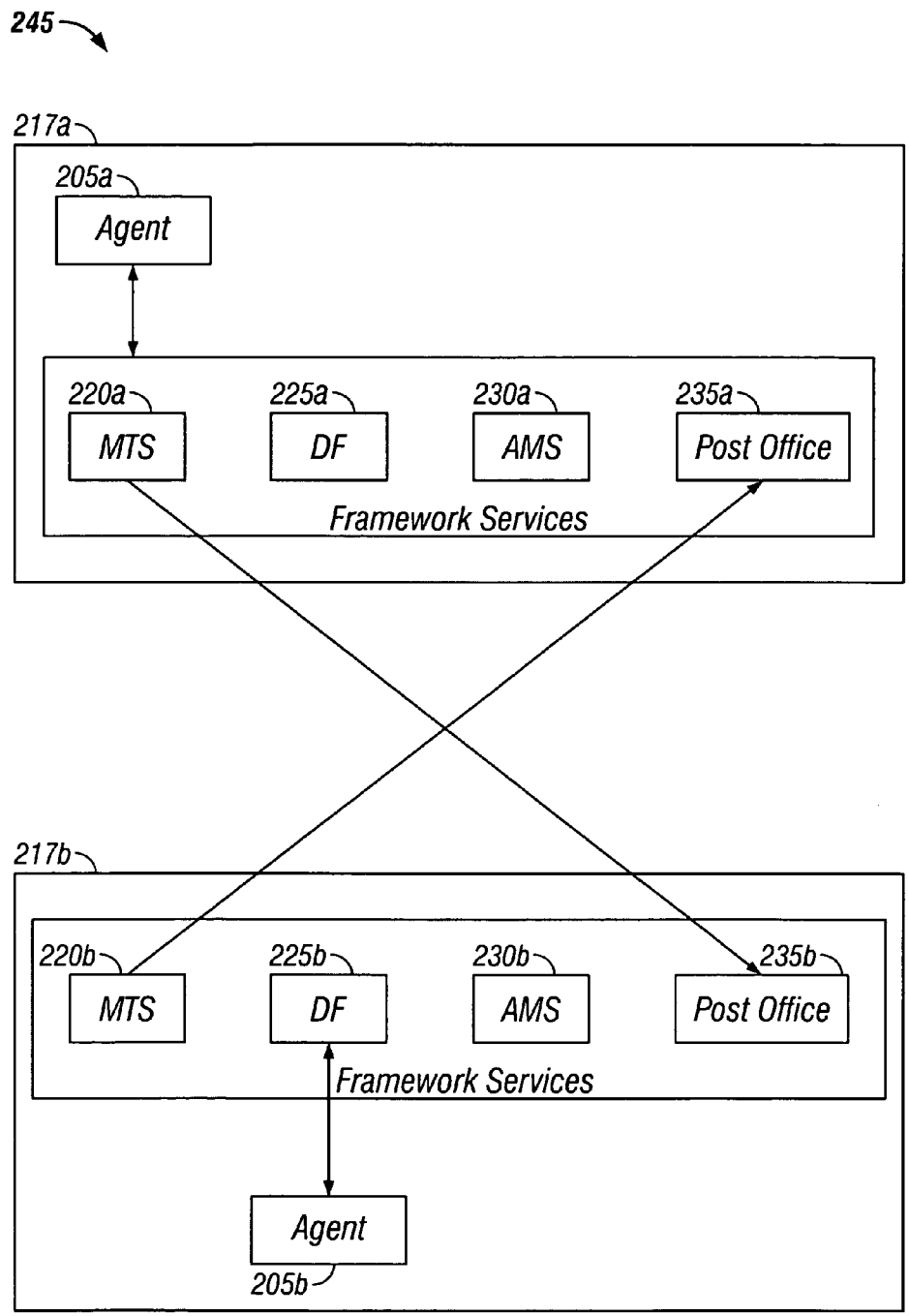
FIG. 4 is a plan view of the messaging architecture of the agent community of FIG. 3.

FIG. 4 illustrates the messaging architecture of the agent community 245. If the agent 205a requires the type of service provided by the agent 205b, the agent uses its DF function 225a to perform a capability directory lookup. The DF 225a informs the agent 205a that the agent 205b is capable of the type of service that it desires. The agent 205a then formulates an AclMessage and asks its local MTS 220a to deliver that message. The MTS 220a uses the DF 225a to locate the Post Office 235b for the agent 205b, and delivers the message to that Post Office 235b. The messaging architecture can be implemented using Java's Remote Method Invocation ("RMI") to deliver the message to the Post Office 235b. By providing flexibility in the design of the framework 217, the architecture can be implemented using other message transport mechanisms in the MTS, such as SOAP, JMS, CORBA, and JINI.

Figure 5:
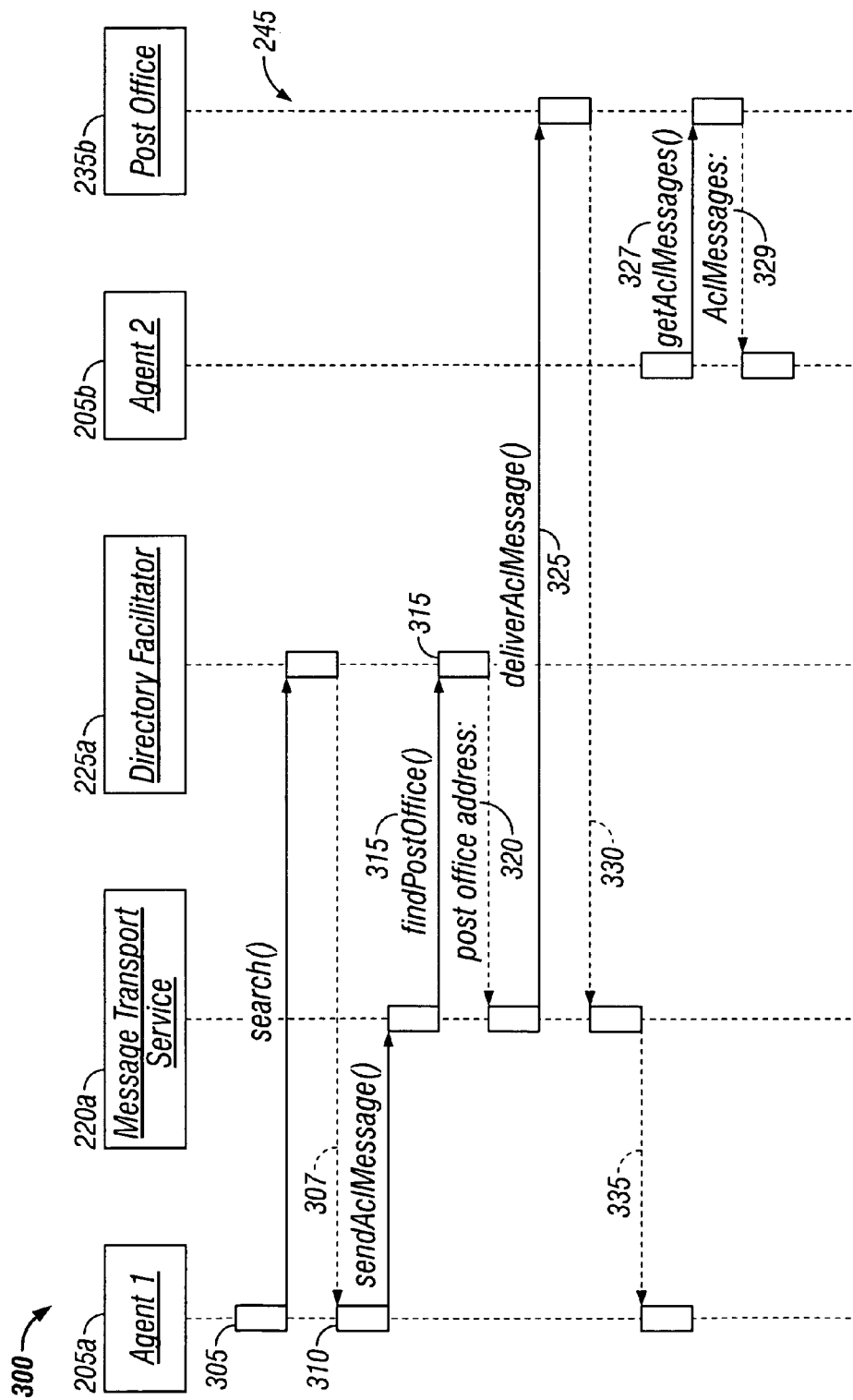
FIG. 5 is a plan view of a communication sequence between a pair of agents.

FIG. 5 illustrates a communication sequence for a typical communication scenario 300 that is indicative of the type of interactions that occur within the agent community 245. For example, the agent 205a can be implemented as an inventory early warning agent that is used to monitor the level of inventory on a shelf or within a store or a warehouse, process the inventory information, determine whether to replenish the inventory, and communicate a request to replenish the inventory. The agent 205a can receive inventory data from, for example, a computer system that receives sales data from a cash register scanning system. The agent 205a accumulates the sales data and processes the data continuously, periodically, or in a batch mode. As described in greater detail below, the agent 205a also must analyze the data and determine whether to request a replenishment of the inventory. The analysis can be as simple as a comparison of the amount of stock remaining to a threshold value or as complex as a statistical analysis of the likelihood that the stock will be emptied if the stock is not replenished within a set time. The scenario of FIG. 5 assumes that the agent 205a has determined that additional stock is required and will contact the agent 205b to deliver a replenishment request in a message. The agent 205b can be, for example, an agent used at a manufacturer or warehouse to communicate inventory levels to agents at stores that are served by the manufacturer or warehouse.

In the scenario of FIG. 5, the agent 205a wishes to send a message to agent 205b. The diagram shows the sequence of messages between participating objects to accomplish this scenario. First the agent 205a invokes a searchDirectory method 305, which is processed by the DF 205 and the result is returned to the agent 205a in a message 307. The agent 205a creates an AclMessage 310, retrieves the identification of agent 205b from the search result, sets the identification in the message's recipient field, and invokes a sendAclMessage 310. The sendAclMessage 310 is processed by the message transport service 220a ("MTS"), which communicates with the DF 225a in a findPostOffice communication 315 to find the Post Office address 320 for the agent 205b. The Post Office address 320 is communicated to the MTS 220a, which then delivers a message 325 to that Post Office 235b. The agent 205b queries the Post Office 235b in a query 327 and then uses a retrieval 329 to retrieve the message from the Post Office 235b for processing. The Post Office 235b also sends an acknowledgement communication 330 to the MTS 220a, which sends a communication 335 to the agent 205a. Like the agent 205a, the agent 205b can use an analytical method to determine whether to tell either the manufacturer to build more product or the warehouse to ship more product.

As described briefly above, the agents discussed above can perform analysis of the inventory data that they receive to determine if there is likely to be a potential variation in inventory levels and, if so, when to request a replenishment of the inventory from a warehouse or the production of goods by a manufacturer to replenish the inventory in a warehouse or at a store. The analysis can be a simple process involving the comparison of inventory on the shelf or in a warehouse to a threshold value. If the inventory level is above the threshold value, the agent does not request replenishment but if the inventory level is at or below the threshold value the agent requests replenishment. Such an analysis does not take into account the likelihood that the stock on the shelf or in the warehouse will be sold quickly or slowly or that there can be some variability in the rate at which the stock is sold. Moreover, such an analysis does not take into account the likelihood that the warehouse or manufacturer will have sufficient stock on hand to supply the store, much less the likelihood that the warehouse or manufacturer can make a timely delivery. To ensure that the store, warehouse, or manufacturer has adequate quantities of stock to meet its needs while also minimizing excessive inventory levels, the agent 205 uses a conditional probabilistic predictive statistical analysis to predict an expected inventory level, an upside confidence bound, and a downside confidence bound. For many companies, an expected inventory level that is near or below zero is undesirable. The company can determine the minimum low level, compare the expected inventory level to the company's minimum low level, and order more stock if these expected levels are below the minimum low level.

Figure 6:
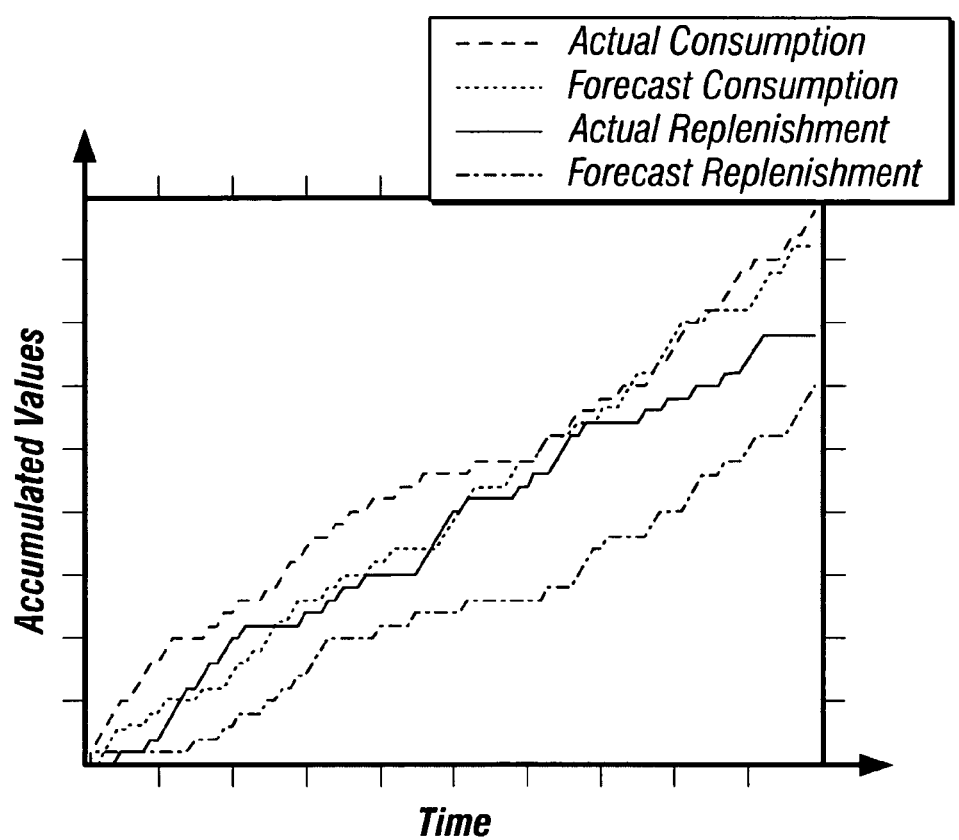
FIG. 6 is a graph illustrating cumulative inventory variables over time.

As shown in FIG. 6, the input data for the conditional probabilistic predictive statistical analysis is forecast cumulative consumption, forecast cumulative replenishment, actual cumulative consumption, and actual cumulative replenishment. FIG. 6 illustrates these values over time. In particular, the input data for the analysis includes a time advance, an actual cumulative replenishment, a forecast cumulative replenishment, an actual cumulative consumption, and a forecast cumulative consumption. The time advance variable is the setting describing how far in advance the prediction is intended. For example, a company concerned about its inventory levels for the next week would set the time advance to be seven days into the future. The actual cumulative replenishment variable describes the total amount of new material actually received into inventory up until the time advance is reached. The forecast cumulative replenishment describes the total amount of new material activities expected to be received into inventory up until the time advance is reached. The actual cumulative consumption describes the total amount of material actually withdrawn from inventory up until the time advance is reached. The forecast cumulative consumption describes the total amount of material expected to be withdrawn from inventory up until the time advance is reached. Of the predicted output values, the expected inventory level is the expected inventory level for the given time advance. The upside 10% confidence bound is the inventory value that the inventory level has a 10% chance of exceeding. The downside 10% confidence bound is the inventory value that the inventory level has a 10% chance of being below.

Any suitable statistical method can be used to determine the inventory level and confidence bounds. For example, the statistical analysis used by the agent can be implemented with a predictive statistical model that can predict the variability at any point along the planned inventory trajectory, can be started with very little historical inventory data, and can improve as the data is generated over time. The plot of planned and actual inventory trajectories illustrated in FIG. 6 creates a number of records for training the predictive model: one for each time point in the plot. As such, such a dataset will only be complete when the data has been actually generated right up until the end of the plot.

One such statistical model that can be used is a probabilistic inference model based on a conditional Gaussian approximation. This model, its derivation, and its application to the inventory early warning agent are explained in more detail below.

To derive the model used for explanation purposes, there is an assumption of a known, planned forecast for inventory levels over time. The planned forecast is a piecewise constant function specified by its breakpoints. As illustrated in FIG. 6, the historical data is a record of planned and actual inventory levels over time. This data is generated as follows. Initially, at any given point in time, for example, day one, there is a forecast for consumption and replenishment for the next $\tau$ time periods and thus a forecast for the actual inventory levels out to time $\tau$. Along with this predicted consumption there is assumed to be a planned replenishment resulting in planned inventory levels out $\tau$ time periods into the future. The next day a new forecast is generated for consumption and replenishment out to time $\tau+1$ resulting in another planned inventory. Using this historical data, D, the model is based on determining the density P(I|D), where I is the vector of actual inventory levels at q predefined times $[I(t_1) \ldots I(t_q)]^T$ in the future.

To actually develop a prediction algorithm, assume that inventory level plans are generated in regular fixed intervals, $\Delta$ (for example, every day at midnight), and set the origin of time to be the time at which there is the earliest historical plan in the dataset. This origin of time can be recent and provide a very limited number of data points. Thus, plans are generated at times $n\Delta$ for $n \in Z^+$, where n is the index of the most recent planning period. Further, assume that all plans are generated out to a horizon of $\tau(>\Delta)$ and indicate the inventory levels of plans generated at time $n\Delta$ by $I_n^P(n\Delta+\delta)$, where $0 \leq \delta \leq \tau$ is a continuous quantity. Because plans are generated at midnight, $\delta=0$ in the future. This inventory plan is piecewise constant and specified by its breakpoints $(I_n^P(b), \delta_n^P(b))$ for $\delta_n^P(b) \geq 0$ and $b \in [1, \ldots, B_n]$ where $B_n^P$ is the number of breakpoints defining the n th plan. For conciseness define $I_n^P(\cdot)$ and $\delta_n^P(\cdot)$ to be the $B_n^P$ vectors with components $[I_n^P(b) \ldots I_n^P(B_n^P)]^T$ and $[\delta_n^P(b) \ldots \delta_n^P(B_n^P)]^T$. Furthermore, let $I^a(t)$ be the actual inventory at time $t>0$. The inventory is not measured at all times, but can be interpolated from a piecewise constant function. The breakpoints defining the actual inventory are given by $(I^a(b), t^a(b))$ for $b \in [1, B^a]$ where $B^a$ is the number of breakpoints defining the actual inventory and all $t(b) \geq 0$. $I^a(\cdot)$ and $t^a(\cdot)$\$ are the $B^a$ vectors $[I^a(b) \ldots I^a(B^a)]^T$ and $[t^a(b) \ldots t^a(B^a)]^T$, respectively.

Based on the definitions above, for any time t there are a number of plans that predict the inventory at that time. For example, the most recent plan was formed at $\bar{s} = \lfloor t/\Delta \rfloor$ and the oldest plan was generated at $\underline{s} = \lfloor (t-\tau)/\Delta \rfloor$ where s=quantity of stock ordered at the beginning of the period t. If $t=m\Delta+\delta$ with $0 \leq \delta \leq \tau$ the most recent plan was formed at $\bar{s}(m,\delta) = \lfloor m+\delta/\Delta \rfloor$ and the oldest plan was formed at $\underline{s}(m,\delta) = \lfloor m-(\tau-\delta)/\Delta \rfloor$ where m=the model stock quantity, for example, the company-specified desirable amount of stock on the shelf or in the warehouse. The number of plans forecasting any particular time is always $\lceil \tau/\Delta \rceil$ but the number of plans generated for time $m\Delta+\delta$ at or before $m\Delta$ is $s(\delta) = \lceil (\tau-\delta)/\Delta \rceil$.

Based on the above notation it is straightforward to develop or build the model and specify the data from which to build the model. Specifically, if n is the index of the most recent planning period, the times at which the model must predict the inventory levels are given by $t_\beta = n\Delta - \delta_\beta$. By defining the q vector $\delta \equiv [\delta_1, \ldots, \delta_q]^T$, the model can be used to determine $P(I|n, \delta, I_{-2}^P(\cdot 1), \delta_{-2}^P(\cdot 1), I^a(\cdot), t^a(\cdot))$, where $I_{-2}^P(\cdot 1) = [I_1^P(\cdot) \ldots I_N^P(\cdot)]^T$ and $\delta_{-2}^P(\cdot 1) = [\delta_1^P(\cdot) \ldots \delta_N^P(\cdot)]^T$. To understand how the algorithm works it is helpful to understand how order streams are converted to the inventory levels that serve as the input to the aggregate predictor. Since the algorithm works entirely with inventory levels (whether planned or actual), consumption and replenishment order streams need to be converted into inventory levels. Conceptually, this is straightforward: replenishment orders increase the inventory while consumption orders decrease inventory. The only complication is that consumption and replenishment are only measured at certain times such that there is not data describing what happened to the inventory between those times at which the inventory was measured. Additionally, the times at which the measurements are taken can be irregularly spaced. Both of these problems are easily solved with a model of inventory levels between measurements.

The model of inventory levels is based on scenarios to which the inventory is actually subjected. As such, there are a variety of occurrences that might happen to the inventory levels between measurements. The simplest case is that the inventory was unchanging between measurements. This is termed the piecewise constant case since it is possible to interpolate inventory levels between measurements by using a piecewise constant function. Alternatively, if successive inventories are measured as $(I_1, t_1)$ and $(I_2, t_2)$ it is possible to linearly interpolate the inventory level at time t (where $t_1 \leq t \leq t_2$) as $I(t) = I_1 + (I_2 - I_1)(t - t_1)/(t_2 - t_1)$. The model is based on the assumption of a piecewise constant rather than piecewise linear interpolation, although either choice or other interpolation mechanism is acceptable for data preparation since the algorithm is independent as to the choice. All the algorithm requires is that the inventory levels be measured at equally spaced intervals, $\Delta$, and this can always be accomplished by interpolation by either method.

The particular approach used with the IEWA uses the essential idea of exploiting correlations in errors between planned inventories and the actual inventories themselves. These correlations are used to estimate a probability density for a number of errors and then condition this density on the available data at the time a prediction needs to be made to find the likely errors at the time of prediction. The most likely correction to the planned inventory can then be applied to estimate the most likely actual inventory. The full probability can be used to define confidence intervals around this most likely prediction. Examples of correlations in errors include seasonal errors in inventory, such as season changes in inventory related to holidays or other seasonal events.

The estimation of the actual inventories uses an estimation of the systematic errors made in the planning process. Consequently, the model uses an error function defined so that $I^a(t) = I_n^P(t - n\Delta) + f_n(t - n\Delta)$ where $n\Delta$ is the time at which the plan was generated and which must satisfy $t - n\Delta \leq \tau$. For prediction into the future the model needs only an estimate of $f_n(t)$ since $I(n\Delta + \delta_\beta) = I^a(n\Delta + \delta_\beta) = I_m^P((n-m)\Delta + \delta_\beta) + f_m((n-m)\Delta + \delta_\beta)$ for all q choices of $\delta$. In the model, $f_n$ is defined as $f_n = [f_n(n\Delta + \delta_1) \ldots f_n(n\Delta + \delta_q)]^T$, the vector of errors made by the nth plan as it forecasts the future. Knowing the probability density for $f_n$ is all that is needed since the density for $I^a$ simply shifts the mean.

The next step is to estimate $P(f_n)$ given the historical data by exploiting two types of correlations that likely exist in the data. First, the elements of $f_n$ are likely correlated because if inventory is high (or low) at time $n\Delta+\delta_1$ then it is also likely to be high (or low) at the later time $n\Delta+\delta_2$ so long as $\delta_2$ is not much greater than $\delta_1$. Moreover, it is reasonable to assume that the plans formed at subsequent planning periods will be correlated since the more recent plan is probably an update of an older plan. To capture such relationships in the historical data, the algorithm uses a model of the joint density $P(f_n, f_{n-1}, \ldots, f_{n-p})$. A reasonable choice of p is $p=\tau$, although a good choice of p is that value determined by an autoregression algorithm. A suitable model for the joint density is that of a Gaussian joint density, as follows:

$$P(\tilde{f}_n) = \frac{1}{\sqrt{(2\pi)^{(p+1)q} det \tilde{\Sigma}}} \exp\left[-\frac{1}{2}(\tilde{f}-\tilde{\mu})^T \tilde{\Sigma}^{-1} (\tilde{f}-\tilde{\mu})\right] \quad (0.1)$$

where $\tilde{f}$ is the vector of length (p+1)q given by $$\tilde{f} = [f_n^T f_{n-1}^T \cdots f_{n-p}^T]^T.$$

As described in more detail below, this Gaussian model can be used for predicting inventory levels and calculating the mean and covariance.

If predicting forward from time $n\Delta$, $P(f_n)$ gives the distribution over the possibilities from which it is possible to infer expected values and confidence intervals. In general, this is obtained from $P(\tilde{f}_n)$ by marginalizing over the previous errors $f_{n-1}, \ldots, f_{n-p}$. However, the inventory situation is not this simple because it is desirable to condition the estimate on previously observed errors and not simply use a static estimate. In addition, many of the elements of the previous errors $f_{n-i}$ are for times greater than $n\Delta$ and consequently are unknown for the purposes of prediction. The unknown elements from $f_{n-i}$ are those for which $(n-i)\Delta+\delta_\alpha > n\Delta$ or more simply those for which $\delta_\alpha > i\Delta$.

As a solution, define $$f_{n-i} = [(f_{n-i}^{\leq})^T (f_{n-i}^{>})^T]^T$$

where, $$f_{n-i}^{\leq} = \{f_{n-i} \mid \delta_a \leq i\Delta\}$$

and $$f_{n-i'}^{>} = \{f_{n-i} \mid \delta_a < i\Delta\}.$$

The density that then must be determined from $P(\tilde{f}_n)$ is $$P(f_n \mid f_{n-1}^{\leq}, \cdots, f_{n-p}^{\leq}),$$

which is easily determined by integration and an application of Bayes rule.

The first step is integrating to determine $$P(f_n \mid f_{n-1}^{\leq}, \cdots, f_{n-p}^{\leq}),$$

as illustrated below:

$$P(f_n \mid f_{n-1}^{\leq}, \cdots, f_{n-p}^{\leq}) = \quad (0.2)$$
$$\int df_{n-1}^{>} \cdots df_{n-p}^{>} P(f_n, f_{n-1}^{\leq}, f_{n-1}^{>} \cdots, f_{n-p}^{\leq}, f_{n-p}^{>})$$

where $$P(f_n, f_{n-1}^{\leq}, f_{n-1}^{>} \cdots, f_{n-p}^{\leq}, f_{n-p}^{>})$$

is given by Eq. (0.1). The integration results in another Gaussian distribution with mean $\mu^{\leq}$ and covariance $\Sigma^{\leq}$. If $N^{>}$ is a subset of $\{1, 2, \ldots, (p+1)q\}$ giving the indices in $\tilde{f}_n$ of $$f_{n-1}^{>}, \cdots, f_{n-p}^{>}$$

and $N^{\leq} = \{1, 2, \ldots, (p+1)q\} \setminus N^{>}$ then $$\mu^{\leq} = \tilde{\mu}(N^{\leq}) \text{ and } \sum^{\leq} = \tilde{\sum}(N^{\leq}, N^{\leq}). \quad (0.3)$$

The notation $a(N_r)$ indicates the $|N_r|$-vector formed from a by keeping the elements in the ordered index set $N_r$. The elements are ordered according to the order in N. Similarly $A(N_r, N_c)$ is the $|N_r| \times |N_c|$ matrix formed from A by keeping the rows in $N_r$ and the columns in $N_c$ in their respective orders. This description uses the common notation that $|S|$ gives the number of elements in the set or vector S.

Applying Bayes rule results in $$P(f_n \mid f_{n-1}^{\leq}, \ldots, f_{n-p}^{\leq}) = P(f_n, f_{n-1}^{\leq}, \ldots, f_{n-p}^{\leq})/$$
$$\int P(f_n, f_{n-1}^{\leq}, \ldots, f_{n-p}^{\leq}) df_n.$$

A standard calculation yields this conditional probability as Gaussian having mean and covariance given by $$\mu(\tilde{f}_n^{\leq}) = \mu_1 + \sum_{1,2} \sum_{2}^{-1} (\tilde{f}_n^{\leq} - \mu_2) \text{ and} \quad (0.4)$$

$$\sum(\tilde{f}_n^{\leq}) = \sum_1 - \sum_{1,2} \sum_{2}^{-1} \sum_{2,1} \text{ where}$$

$$\tilde{f}_n^{\leq} = [(f_{n-1}^{\leq})^T \ldots (f_{n-p}^{\leq})^T]^T.$$

The above formula assumes that $\Sigma_2$ is invertible. In many situations this can not be the case (for example, if the planned and actual activities are always in complete agreement). As such, Eq. (0.4) is modified to be:

$$\mu(\tilde{f}_n^{\leq}) = \mu_1 + \sum_{1,2}\left(\sum_2 + \lambda I\right)^{-1}(\tilde{f}_n^{\leq} - \mu_2) \text{ and} \quad (0.5)$$

$$\sum(\tilde{f}_n^{\leq}) = \sum_1 - \sum_{1,2}\left(\sum_2 + \lambda I\right)^{-1}\sum_{2,1}$$

where I is the identity matrix having the same size as $\Sigma_2$ and $\lambda$ is a small positive quantity (for example, $10^{-5}$). In Eq. (0.5) the $\mu$ vectors are given by $$\mu_1 = \mu^{\leq}(N_1), \mu_2 = \mu^{\leq}(N_2) \quad (0.6)$$

and the $\Sigma$ matrices are defined by $$\Sigma_1 = \Sigma^{\leq}(N_1, N_1), \Sigma_{1,2} = \Sigma^{\leq}(N_1, N_2), \Sigma_{2,1} = \Sigma^{\leq}(N_2, N_1), \text{ and}$$
$$\Sigma_2 = \Sigma^{\leq}(N_2, N_2) \quad (0.7)$$

where the index sets are $N_1 = \{1, 2, \ldots, q\}$ and $$N_2 = \{q+1, q+2, \ldots, |\tilde{f}_n^{\leq}| + q\}.$$

Using the above results, the complete algorithm can be used to make the prediction as follows: (1) assuming a value of p (or having the algorithm determine p), construct an estimate of $$\tilde{\mu} \text{ and } \tilde{\sum}$$

from the historical data; (2) construct the index set $N^{\leq}$ and form $\mu^{\leq}$ and $\Sigma^{\leq}$ from $$\tilde{\mu} \text{ and } \tilde{\sum}$$

according to Eq. (0.3); (3) using historical error values construct the vectors of past errors $$f_{n-1}^{\leq}, \ldots, f_{n-p}^{\leq}; \quad (4)$$

build $$\mu(\tilde{f}_n^{\leq}) \text{ and } \sum(\tilde{f}_n^{\leq})$$

according to Eqs. (0.5), (0.6) and (0.7); and (0.5) return $$[I^p(n\Delta + \delta_1) \ldots I^p(n\Delta + \delta_q)]^T + \mu(\tilde{f}_n^{\leq})$$

as the predicted actual inventory levels and return $$\sum(\tilde{f}_n^{\leq})$$

as the covariance on this estimate.

The first two steps can be done offline in a discrete calculation since they have no dependence on the time for which the prediction is being made. To accomplish the first step and determine the parameters of the Gaussian, there a number of approaches or models that can be used. A first model is based on frequency counts while a second and a third method use an autoregressive model of the multivariate time series $\{f_i\}$. The second and third models differ in the underlying simplifications made, with the second model being more accurate but more complex.

If there is sufficient historical inventory data, the simplest possible way to determine the parameters of the Gaussian is through unbiased frequency count estimates. From the historical record it is relatively easily to build up the following estimates:

$$\hat{\mu} = \frac{\sum_n \tilde{f}_n}{\sum_n 1} \text{ and } \hat{\sum} = \frac{\sum_n (\tilde{f}_n - \hat{\mu})(\tilde{f}_n - \hat{\mu})^T}{-1 + \sum_n 1} \quad (0.8)$$

As additional inventory data is generated, these estimates are easily updated online. As such, the model is adaptive to and learns from changes in conditions.

Because subsequent plans are likely to be related to each other (for example, the latter plan is probably a modification of the former plan) it is a reasonable assumption to model the time series $\{f_i\}$ as an autoregressive process of order p:

$$f_n = w_p + \varepsilon_n + \sum_{j=1}^{p} A_j^p f_{n-j} \quad (0.9)$$

where the errors, $\epsilon_n$, are modeled as i.i.d. zero-mean Gaussian variables described by $N(0, C_p)$. There are many software packages which will efficiently estimate the parameters by maximizing the Gaussian likelihood (for example, least squares) so the model uses the assumption that $w_p$, $C_p$, and all $A_j^p$ are all available. Some packages will attempt to determine the best value of p using a Bayesian information criterion. However, a natural choice in the present setting is p=τ. The proposed predictive algorithm makes use of a number of p.

This probability can be determined as follows:

$$P(f_n, f_{n-1}, \ldots, f_{n-p}) = P(f_n|f_{n-1}, \ldots, f_{n-p})P(f_{n-1}, \ldots, f_{n-p})$$

where $$P(f_n | f_{n-1}, \cdots, f_{n-p}) =$$
$$\frac{1}{\sqrt{(2\pi)^\tau \det C}} \exp\left[-\frac{1}{2}\left(f_n - w_p - \sum_{j=1}^{p} A_j^p f_{n-j}\right)^T C_p^{-1} \left(f_n - w_p - \sum_{j=1}^{p} A_j^p f_{n-j}\right)\right]$$

The model uses a simplification in order to tractably model $P(f_{n-1}, \ldots, f_{n-p})$, which can be written as $$P(f_{n-1}, \cdots, f_{n-p}) = \prod_{j=1}^{p} P(f_{n-j}).$$

The remaining probability P(f) is assumed to be Gaussian, therefore, $P(f) = \exp[-(f-\mu)^T \Sigma (f-\mu)/2]/\sqrt{(2\pi)^\tau \det \Sigma}$ where $\mu$ and $\Sigma$ can be estimated by simple frequency counts from the historical data:

$$\mu = \frac{\sum_n f_n}{\sum_n 1} \text{ and } \sum = \frac{\sum_n (f_n - \mu)(f_n - \mu)^T}{-1 + \sum_n 1} \quad (0.10)$$

The joint probability is then $$P(f_n, f_{n-1}, \cdots, f_{n-p}) = \frac{1}{\sqrt{(2\pi)^{(p+1)q} det \tilde{\Sigma}}} \exp\left[-\frac{1}{2}(\tilde{f} - \tilde{\mu})^T \tilde{\Sigma}^{-1} (\tilde{f} - \tilde{\mu})\right]$$

where $\tilde{f} = [f_n\, f_{n-1}, \ldots f_{n-p}]^T$ and the parameters of the Gaussian are $$\tilde{\mu} = \sum \begin{bmatrix} C_p^{-1} w_p \\ \sum^{-1} \mu + (A_1^p)^T C_p^{-1} w_p \\ \vdots \\ \sum^{-1} \mu + (A_p^p)^T C_p^{-1} w_p \end{bmatrix}$$

and $$\tilde{\Sigma}^{-1} = \begin{bmatrix} C_p^{-1} & -C_p^{-1} A_1^p & \cdots & -C_p^{-1} A_p^p \\ -(A_1^p)^T C_p^{-1} & \sum^{-1} + (A_1^p)^T C_p^{-1} A_1^p & \cdots & (A_1^p)^T C_p^{-1} A_p^p \\ \vdots & \vdots & \ddots & \vdots \\ -(A_p^p)^T C_p^{-1} & -(A_p^p)^T C_p^{-1} A_1^p & \cdots & \sum^{-1} + (A_p^p)^T C_p^{-1} A_p^p \end{bmatrix}$$

$\Sigma^{-1}$ can be inverted using the identity that if $$A = \begin{bmatrix} V_1 V_1^T & V_1 V_2^T & \cdots & V_1 V_p^T \\ V_2 V_1^T & B + V_2 V_2^T & \cdots & V_2 V_p^T \\ \vdots & \vdots & \ddots & \vdots \\ V_p V_1^T & V_p V_2^T & \cdots & B + V_p V_p^T \end{bmatrix}$$

then $$A^{-1} = \begin{bmatrix} (V_1^T)^{-1}(I + V_2^T B^{-1} V_2 + \cdots + V_p^T B^{-1} V_p) V_1^{-1} & -(V_1^T)^{-1} V_2^T B^{-1} & \cdots & -(V_1^T)^{-1} V_p^T B^{-1} \\ B^{-1} V_2 V_1^{-1} & B^{-1} & \cdots & 0 \\ \vdots & \vdots & \ddots & \vdots \\ B^{-1} V_p V_1^{-1} & 0 & \cdots & B^{-1} \end{bmatrix}$$

In the present case take $B = \Sigma^{-1}$, $$V_1 = -C_p^{1/2}, \text{ and } V_i = A_i^T C_p^{-1/2}$$

for $i \in [2, \ldots, p]$ where $$C_p^{-1/2}$$

is the Cholesky decomposition of $C^{-1}$ to find $$\tilde{\Sigma} = \begin{bmatrix} C_p + A_1^p \sum (A_1^p)^T + \ldots + A_p^p \sum (A_p^p)^T & A_1^p \sum & \cdots & A_p^p \sum \\ \sum (A_1^p)^T & \sum & \cdots & 0 \\ \vdots & \vdots & \ddots & \vdots \\ \sum (A_p^p)^T & 0 & \cdots & \sum \end{bmatrix}$$

and, by multiplying, the mean is found to be:

$$\tilde{\mu} = \begin{bmatrix} w_p + (A_1^p + \ldots + A_p^p)\mu + (A_1^p \sum (A_1^p)^T + \ldots + A_p^p \sum (A_p^p)^T) C_p^{-1} w_p \\ \mu \\ \vdots \\ \mu \end{bmatrix}.$$

As noted above, $P(f_{n-1}, \ldots, f_{n-p})$ was simplified to the form $$\prod_{j=1}^{p} P(f_{n-j}).$$

This can be improved by writing $$P(f_{n-1}, \ldots, f_{n-p}) = \underbrace{P(f_{n-1} \mid f_{n-2}, \ldots, f_{n-p})}_{AR(p-1)}$$
$$\underbrace{P(f_{n-2} \mid f_{n-3}, \ldots, f_{n-p})}_{AR(p-2)} \cdots$$
$$\underbrace{P(f_{n-p+1} \mid f_{n-p}) P(f_{n-p})}_{AR(1)}.$$

As noted in the above equations, each conditional probability can be modeled as an autoregressive process of successively smaller orders. The parameters of each process can be determined from the historical times series. For the final unconditional probability the model uses the same Gaussian assumption as before. Each conditional probability for the AR(p–i) process is written as $$P(f_{n-i} \mid f_{n-i-1}, \cdots, f_{n-p}) = \frac{\exp\left[-\frac{1}{2}\left(f_{n-i} - w_{p-i} - \sum_{j=1}^{p-i} A_j^{p-i} f_{n-j-i}\right)^T C_{p-i}^{-1}\left(f_{n-i} - w_{p-i} - \sum_{j=1}^{p-i} A_j^{p-i} f_{n-j-i}\right)\right]}{\sqrt{(2\pi)^q \det C_{p-i}}}$$

and the unconditional probability for $f_{n-p}$ is the same as before having mean $\mu$ and covariance $\Sigma$. Combining all these results shows that the joint density $P(f_n, \ldots, f_{n-p})$ is Gaussian with precision (inverse covariance) given by $$\tilde{\Sigma}^{-1}$$

(whose rows and columns have been ordered according to $\tilde{f}$), which can be formed as $$\tilde{\Sigma}^{-1} = V_p V_p^T + \ldots + V_1 V_1^T + V_0 V_0^T$$

where $C_0 \equiv \Sigma$ and the $(i+1)q \times q$ matrices $V_i$ are given by $$V_p = \begin{bmatrix} -C_p^{-1/2} \\ (A^p)^T C_p^{-1/2} \end{bmatrix}, V_{p-1} = \begin{bmatrix} 0 \\ -C_{p-1}^{-1/2} \\ (A^{p-1})^T C_{p-1}^{-1/2} \end{bmatrix}, \ldots, V_0 = \begin{bmatrix} 0 \\ \vdots \\ 0 \\ -C_0^{-1/2} \end{bmatrix}$$

and $A^p$ is the $q \times pq$ matrix given by $A^p = [A_1^p \, A_2^p \ldots A_p^p]$. Given this particular form for the precision matrix, its Cholesky decomposition can immediately be written down as $$\begin{bmatrix} -C_p^{-1/2} & 0 & \cdots & 0 \\ (A_1^p)^T C_p^{-1/2} & -C_{p-1}^{-1/2} & \cdots & 0 \\ \vdots & \vdots & \ddots & \vdots \\ (A_p^p)^T C_p^{-1/2} & (A_{p-1}^{p-1})^T C_p^{-1/2} & \cdots & -C_0^{-1/2} \end{bmatrix}.$$

In this form the inverse is easier to calculate If an inverse of the form below is necessary:

$$\begin{bmatrix} -(C_p^{1/2})^T & 0 & \cdots & 0 \\ (C_{p-1}^{1/2})^T Q_1^p & -(C_{p-1}^{1/2})^T & \cdots & 0 \\ \vdots & \vdots & \ddots & \vdots \\ (C_0^{1/2})^T Q_p^p & (C_0^{1/2})^T Q_p^{p-1} & \cdots & -(C_0^{1/2})^T \end{bmatrix}$$

then the Q matrices must satisfy:

$$I\delta_{i,j} = \sum_{\alpha=j}^{\min(p-j,i)} (A_{i-\alpha}^{p-\alpha})^T Q_{\alpha-j}^{p-j} \text{ for } 0 \le i+j \le p \text{ and } j \le i$$

where $A_0^i = Q_0^i \equiv -I$. The iterative solution satisfying the requirement is given by $$Q_i^{p-j} = \sum_{\alpha=j}^{i+j-1} (A_{i+j-\alpha}^{p-\alpha})^T Q_{\alpha-j}^{p-j} \text{ starting from } Q_0^{p-j} = -I.$$

Thus the covariance matrix, $$\tilde{\Sigma},$$

is equal to $$\begin{bmatrix} \sum_{k=0}^{p} (Q_k^p)^T C_{p-k} Q_k^p & \sum_{k=0}^{p-1} (Q_{k+1}^p)^T C_{p-1-k} Q_k^{p-1} & \sum_{k=0}^{p-2} (Q_{k+2}^p)^T C_{p-2-k} Q_k^{p-2} & \cdots & (Q_p^p)^T C_0 Q_0^0 \\ \sum_{k=0}^{p-1} (Q_k^{p-1})^T C_{p-1-k} Q_{k+1}^p & \sum_{k=0}^{p-1} (Q_k^{p-1})^T C_{p-1-k} Q_k^{p-1} & \sum_{k=0}^{p-2} (Q_{k+1}^{p-1})^T C_{p-2-k} Q_k^{p-2} & \cdots & (Q_{p-1}^{p-1})^T C_0 Q_0^0 \\ \sum_{k=0}^{p-2} (Q_k^{p-2})^T C_{p-2-k} Q_{k+2}^p & \sum_{k=0}^{p-2} (Q_k^{p-2})^T C_{p-2-k} Q_{k+1}^{p-1} & \sum_{k=0}^{p-2} (Q_k^{p-2})^T C_{p-2-k} Q_{k+1}^{p-2} & \cdots & (Q_{p-2}^{p-2})^T C_0 Q_0^0 \\ \vdots & \vdots & \vdots & \ddots & \vdots \\ (Q_0^0)^T C_0 Q_p^p & (Q_0^0)^T C_0 Q_{p-1}^{p-1} & (Q_0^0)^T C_0 Q_{p-2}^{p-2} & \cdots & (Q_0^0)^T C_0 Q_0^0 \end{bmatrix}$$

This matrix can be easily implemented in software as executable instructions to provide the covariance.

Having determined the covariance matrix, the mean is determined by completing the square:

$$\tilde{\mu} = \tilde{\Sigma} \begin{bmatrix} C_p^{-1} & 0 & 0 & \cdots & 0 \\ C_p^{-1}A_1^p & C_{p-1}^{-1} & 0 & \cdots & 0 \\ C_p^{-1}A_2^p & C_{p-1}^{-1}A_1^{p-1} & C_{p-2}^{-1} & \cdots & 0 \\ \vdots & \vdots & \vdots & \ddots & \vdots \\ C_p^{-1}A_p^p & C_{p-1}^{-1}A_{p-1}^{p-1} & C_{p-1}^{-1}A_{p-2}^{p-2} & \cdots & C_0^{-1} \end{bmatrix} \begin{bmatrix} w_p \\ w_{p-1} \\ w_{p-2} \\ \vdots \\ w_0 \end{bmatrix}$$

with $$\tilde{\Sigma}$$

as above. Again this matrix and its square are easily implemented in software as executable instructions.

Although complex on paper, the algorithm is computationally very efficient. During the training phase the covariance matrix and its mean can be estimated with a single pass through the data by recording frequency counts. If there are D data points then the complexity of accomplishing both tasks is of the order $O(D(p+1)q((p+1)q+1))$. Prediction is not much more complicated. The dominant factor is the computation of $$\tilde{\Sigma}_2^{-1},$$

which is of order $O(|N_2|^3)$. Moreover, this matrix inverse can be stored and need not be recalculated with each prediction.

To be used as an online algorithm, the above algorithm must be modified so that it can operate in an online mode in which all parameters of the algorithm (that is, the mean and covariance) are continually updated as new data arrives so that it is adaptive. This is straightforward because updates to the mean and covariance are simple to implement in software. The algorithm also can be modified to discount data from the past by a factor $0 \leq \lambda \leq 1$. This allows the algorithm to learn from recent events and adapt to changing conditions. Thus, if the data $f_1, \ldots, f_{T-2}, f_{T-1}, f_T$ is available at time T, the estimate of the mean is $$\hat{\mu}_T = \frac{f_T + \lambda f_{T-1} + \lambda^2 f_{T-2} + \cdots + \lambda^{T-1} f_1}{D_T(\lambda)} \quad (0.11)$$

and the estimate of the covariance at time T as $$\hat{\Sigma}_T = \frac{(f_T - \hat{\mu})(f_T - \hat{\mu})^T + \lambda(f_{T-1} - \hat{\mu})(f_{T-1} - \hat{\mu})^T + \cdots + \lambda^{T-1}(f_1 - \hat{\mu})(f_1 - \hat{\mu})^T}{-1 + D_T(\lambda)} \quad (0.12)$$

where the denominator is given by $D_T(\lambda) = 1 + \lambda + \ldots + \lambda^{T-1} = (1-\lambda^T)/(1-\lambda)$. With these definitions the algorithm can be implemented in software to provide running estimates of the mean and covariance and update them as $$\hat{\mu}_T = \frac{f_T}{D_T(\lambda)} + \lambda \frac{D_{T-1}(\lambda)}{D_T(\lambda)} \hat{\mu}_{T-1} \quad (0.13)$$

and $$\hat{\Sigma}_T = \frac{(f_T - \hat{\mu})(f_T - \hat{\mu})^T}{-1 + D_T(\lambda)} + \lambda \frac{-1 + D_{T-1}(\lambda)}{-1 + D_T(\lambda)} \hat{\Sigma}_{T-1} \quad (0.14)$$

The discount factor $\lambda$ should be set to match the time scale for variation of the problem. If behavior is stationary then $\lambda=1$ otherwise $\lambda$ should be set from the data. One quick and basic manner to accomplish this is to match some characteristic time of variation, T to the average discount time $1/(1-\lambda)$, that is, $\lambda=(T-1)/T$. Another way to set $\lambda$ is by minimizing the cross-validation error.

Figure 7:
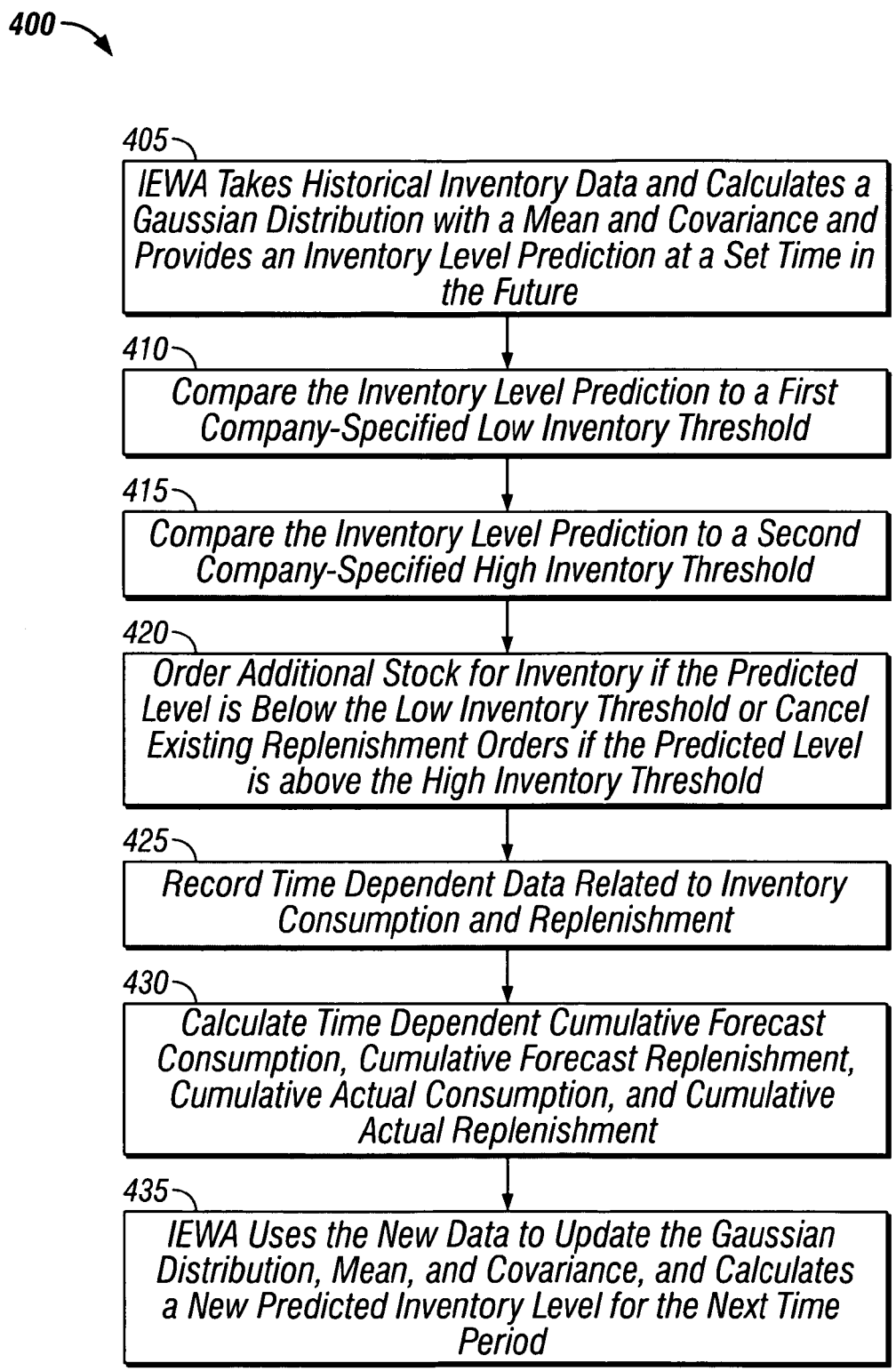
FIG. 7 is a flow chart illustrating the operation of an IEWA to predict an inventory level.

As shown in FIG. 7, in one implementation 400 in a supply chain management system, the IEWA uses a probabilistic predictive algorithm embodied in executable instructions on one or more computer systems to estimate future inventory levels as follows: First, the IEWA takes any historical inventory data to calculate a Gaussian distribution with a mean and covariance and provide an inventory prediction at a set time in the future (step 405). The computer systems can be further programmed to compare the prediction to a first company-specified low inventor threshold and to a second company-specified high inventory threshold (step 410). The IEWA can be programmed to order additional stock for inventory if the predicted level is below the low inventory threshold (step 415) or cancel existing replenishment orders if the threshold is above the high inventory threshold (step 420). The IEWA then records time dependent data related to inventory consumption and replenishment (step 425) so that it can calculate time dependent cumulative forecast consumption, cumulative forecast replenishment, cumulative actual consumption, and cumulative actual replenishment (step 430). This data can vary over time, seasonally, and for unknown reasons, such as recessions or other changes in economic conditions. The IEWA uses this new data with the historical data to update the Gaussian distribution, mean, and covariance and calculate a new predicted inventory level for the next time period (step 435). Over time, the data accumulated has the likelihood of improving the predicted inventory level within the supply chain management system as the amount of data increases in volume.

As noted above, the IEWA can use two modes of operation for the predictive function: the aggregate mode and the detailed mode. The aggregate, described above, generally uses real time data and accumulated data. The detailed mode is based on a detailed model that used detailed data that has been previously generated. Using the detailed model, the prediction task is split into two agents: (1) an Activity Risk Agent, and (2) an Early Warning Agent. The Activity Risk Agent conducts activities learning about potential variation based on historical performance, determines estimates of variation for currently planned activities, and provides those estimates to the Early Warning Agent. The Activity Risk Agent uses individual activities records for the activities learning about potential variation. The activities records contain both promised and actual delivery time and quantity. Using this data, the detailed model generates predictions for actual delivery dates and quantities for not yet completed activities.

The detailed model uses decision trees as the initial approach to machine learning. In one implementation, the detailed model uses Classification and Regression Trees (CART®) because these trees: (1) are easy to train and maintain, and (2) perform nearly as well as other machine learning techniques, such as neural networks, that are usually much harder to train, and from which knowledge cannot be extracted easily. Furthermore, classification and regression trees can be implemented and applied to data that consists of both continuous and discrete attributes. However, the use of other machine learning techniques is not precluded by this choice.

The general assumption upon which the detailed model is based is the observation that different suppliers or consumers of a particular material can have behavioral patterns that determine how much and when they deliver or consume materials with respect to what they promise in their order. For example, some suppliers can follow their delivery schedule very closely, some suppliers can be consistently late in delivering their orders, and some consumers can cancel orders frequently. These behavioral patterns can be learned if they are statistically significant. For example, some consumers, such as retailers, can regularly cancel orders after holidays because of prior overstocking of their inventories in anticipation of unrealized sales. Similarly, some suppliers can regularly deliver orders late around holidays because, for example, they regularly over-commit to their customers. Decision trees can be used to learn these patterns.

Generally, an algorithm used in the detailed model involves the building of a decision tree, determining splitting points on the decision tree, pruning the decision tree, extracting precise measurements of variability from the decision tree, and date pruning. A decision tree predicts an attribute by asking a succession of yes/no questions about known predictors. Each non-leaf node in the tree contains a question, and each leaf node contains a prediction. Such predictions can be, for example, single values plus standard deviations when the response is a continuous variable, or a class annotated with a probability when the response is a discrete valuable (that is, known as a classification tree).

The questions in non-leaf nodes refer to values of predictor variables. When those variables are continuous, the questions are in the form "is x less than C?" where C is a constant value. When the variables are discrete, the questions are in the form "does x belong to one of the classes A, C or F?" where A, C and F are some of the classes to which the discrete variable can belong.

The task of extracting a prediction from a decision tree can be relatively simple, as it involves traversing the tree according to the questions the tree poses. Building the tree itself, however, can be quite difficult. For this purpose, data-mining techniques are used that infer a tree from detailed data where the response variable is known. Typically, these techniques seek to find splitting points in the predictors (that is, these techniques seek questions) such that the split is maximally informative, thus minimizing the number of subsequent questions needed to reach a prediction.

One particular type of decision tree is the CART®, noted above. This type of decision tree advantageously can be rapidly inferred from data that can contain both continuous and discrete predictors. Moreover, the response variable can be continuous or discrete itself.

Classification and regression trees are constructed in two stages: (1) a growing stage and (2) a pruning stage. In the first, growing stage, the data is recursively split using a criterion that makes the split maximally informative. In the second, pruning stage, the tree is pruned back to avoid over-fitting and to obtain an adequate level of generality.

The growing part of the algorithm works according to the following general procedure. Initially, for all predictors, select those predictors in which the data exhibits the, possibility of an informative split. If, however, no predictors meet this criterion, exit. Otherwise, choose the split that is most informative, and repeat until no more splits are considered worthy.

The criterion used for seeking split points when the response variable is continuous is based on Analysis of Variance (ANOVA) techniques. Using ANOVA, if the predictor variable x itself is continuous, it is sorted in ascending order, and then a point $x_s$ is chosen such that the expression $$\sum (y_i - \bar{y})^2 - \left( \sum_{x_i \leq x_s} (y_i - \bar{y})^2 + \sum_{x_i > x_s} (y_i - \bar{y})^2 \right)$$

is maximized, where y is the response variable. Once such a point, $x_s$, is chosen, the above expression on that point serves as the score for the split on that variable (normalized with respect to the mean value of the response). By normalizing the variable, its worthiness can be evaluated globally.

The Analysis of Variance approach also can be used for discrete predictor variables. For discrete predictor variables, each of the classes that the predictor variable can belong to is ranked by the mean of their corresponding response values, and then a split is chosen using the same criterion as above by shuffling classes between two groups starting with those of smaller rank and moving them in a Graycode order.

When the response is discrete, the Gini rule is used, which requires the searching for a splitting point that isolates most frequently the largest class in the response. For this purpose, assume that the predictor is continuous, and that, as above, the splitting point is $x_s$. This point partitions the response into two sets, $P_L$ and $P_R$. For each response class j, define p(j|L) and p(j|R), the probabilities that a member of class j belongs to $P_L$ or $P_R$, respectively, as $$p(j|L) = \frac{\sum_{x_i \leq x_s} \begin{cases} 1 & \text{if } y_i \in j \\ 0 & \text{otherwise} \end{cases}}{|P_L|}, \; p(j|R) = \frac{\sum_{x_i > x_s} \begin{cases} 1 & \text{if } y_i \in j \\ 0 & \text{otherwise} \end{cases}}{|P_R|}.$$

Then, the expression to minimize is the total impurity, given by $$|P_L| \sum_{x_i \leq x_s} \sum_{j_s} p(j|L) I(p(j|L)) + |P_R| \sum_{x_i > x_s} \sum_{j_s} p(j|R) I(p(j|R)),$$

where I(p) is the impurity function, and can be defined either as $1-p^2$ or $-p \log(p)$.

As before, the procedure is similar when the predictor is discrete, in which case the split point is selected using Graycode-ranking.

The optimal size of a decision tree is inferred by cross-validation. The training data is split into multiple equal-sized buckets, and separate trees are grown for subsets of the data that exclude one of the buckets respectively. Each tree is then pruned at all possible degrees, and for each degree, the tree's performance is evaluated using the bucket that was excluded in its construction. The best degree of pruning is then chosen as the one that maximizes average performance across the data in all held-out-buckets. The original tree is then pruned to the chosen degree.

By default, predictions extracted from decision trees are parsimonious, typically consisting of a single-valued prediction and a confidence interval. However, more detailed information can be extracted by annotating each leaf of the tree with the values of the predictor variable of the training data that correspond to that leaf of the tree. The tree then can be seen as a partition of the set of training values for the predictor, and a prediction consists of an entire element of this partition. If binned, such element constitutes a histogram. By performing statistics on the histogram, a user can restore the original parsimonious predictions.

To predict order variability, the user obtains the following data or fields to create decision trees. From this data, three models are extracted: (1) a model to predict variability on actual delivery quantity; (2) a model to predict variability on actual delivery date; and (3) a model to predict order cancellation probability. The dates should be encoded into multiple variables as day of the week, day of the month and month of the year, in addition to a single numeric encoding that represents absolute time. The data or fields and an explanation of that data or field are as follows:

| Field | Explanation |
| --- | --- |
| Update number | Sequential number specifying how many times this activity has been updated up to this record. |
| Creation Date | When the activity was first planned. |
| Current Date | The date when the information in this record was extracted from the activity. |
| Expected Date | The date at which the activity is expected to be fulfilled. |
| Expected Quantity | The amount of material the activity requires. |
| Source of the order | Customer/resource/supplier. |
| Demand at the source in a certain temporal window | The temporal window is can be described as being similar to an 8-hour window prior to the expected completion time. If not available directly, this information could be estimated from aggregating all planned activities involving the source. |
| Actual delivered quantity | Can be expressed as a difference from the expected quantity, as a percentile deviation or as an actual absolute value. |
| Actual delivery date | Can be expressed as a difference from expected date or as an actual date. |
| Time spread | For activities that are completed in more than one piece, for example, the time range of completion. |
| Cancelled | True/False (was the activity cancelled). |

Each of the above fields can be represented as one or more numerical or categorical features for use in the machine-learning algorithm (for example, the expected delivery date can be expressed as day of week, day of year, month of year, etc.). A Data Collection Agent must construct these records by matching up planned activities with their outcomes.

The "source" for an activity is the partner or resource involved in that activity. For each of the four locations of activities used in the model, the source is as follows: (1) for replenishment of raw materials, the source is the supplier; (2) for consumption of raw materials, the source is a resource (for example, production line); (3) for replenishment of finished products, the source is a resource (for example, production line); and (4) for consumption of finished products, the source is a customer. If necessary, additional fields can be implemented for use in the special circumstance of predicting the arrival of last minute orders to be able to predict the variation resulting from orders that are not yet known but that might arrive.

The absolute-time encoding of dates does not play a significant role in prediction since all planned orders used for prediction will lie in the future with respect to historical orders used to build the tree. Instead, if the tree contains splits on absolute time, this will be used as an indication that a qualitative shift in behavior has occurred at those points in time. Training data that is older than the most recent of such points is discarded and a new tree is built using only the most recent data. However, if splits on absolute dates occur deep in the tree, then data should only be discarded if the data reaches those deep splits.

The detailed model described above allows the user to annotate planned activities with potential variation, which, for example, allows the user to annotate a sequence of planned activities with potential variation. As described below, using the potential variation information, a company in a supply chain can obtain the probability distributions of various inventory levels across time. In general, at an initial time an inventory contains a known number of items. In the subsequent time interval, there is scheduled a number of replenishment operations which are planned to be a certain time and quantity, but there is a stochastic variation expected in both time and quantity for each operation. It is assumed that both time and quantity are made discrete so that the distributions are discrete and specifiable as a histogram. Furthermore, the variation in time and quantity is assumed to be independent so that they can be completely specified by two independent histograms over one variable only. To implement the model efficiently, one consideration to be analyzed is how to efficiently propagate the probability distribution between the end of time interval t and the end of time interval t+1. To analyze this efficiency consideration, there are a number of observations that are helpful.

First, at the end of interval t+1, the probability of the inventory having value Q is given by:

$$P(\text{Inventory has } Q \text{ at end of interval } t+1) = \sum_{q=0}^{\infty}$$

$P(\text{Inventory has } q \text{ at time } t)$ $P(\text{Inventory transitions from } q \text{ to } Q \text{ in interval } t+1)$ Second, if there are no outages, the transaction sizes are independent of the current inventory, and hence the probability of transition between two inventory levels is dependent only on the difference between the two inventory levels. That is $P(\text{Inventory transitions from } q \text{ to } Q \text{ in interval } t+1) = f_{t+1}(Q-q)$ Third, because of the first two observations, the time evolution operator for a probability distribution over quantity, $P_t$, in the interval t+1 is given by $P_{t+1} = P_t * f_{t+1}$ where * is the convolution operator and $f_{t+1}$ is the Time-Evolution Filter (TEF) for time t+1.

Fourth, there are two ways of evaluating the convolution operator, each of which has its own domain of efficiency. If $f_{t+1}$ is sparse, (that is, $f_{t+1}(q) \neq 0$ for only a small number of q's) it is more efficient to evaluate the sum directly, since the sum reduces to $$P_{t+1}(Q) = \sum_{q|f(Q-q) \neq 0} P_t(q) f_{t+1}(Q-q)$$

which has only a small number of terms. If $P_t$ is also sparse, as it would be at the initial time when the inventory is known exactly, the convolution reduces further to $$P_{t+1}(Q) = \sum_{q|f(Q-q) \neq 0 \text{ and } P_t(q) \neq 0} P_t(q) f_{t+1}(Q-q)$$

thereby simplifying the problem even more greatly. Fifth, if fall advantage of sparcity is taken, this operation has computation order O(lm) where l and m are the numbers of nonzero elements in $f_{t+1}$, and $P_t$ Sixth, if both $f_{t+1}$ and $P_t$ are non-sparse, it is more efficient to use the Fourier transform formula for the convolution.

$$P_t * f_{t+1} = ifft[fft[P_t] \times fft[f_{t+1}]]$$

where fft and ifft are the fast Fourier transform operator and its inverse. Seventh, the computational order of this operation is O(n log n) where n is the greater of the length of $f_{t+1}$ and $P_t$.

The detailed predictive model can be further developed using time evolution filters for various operations. For example, "ordinary" (that is non-stochastic) transactions can be put into the equations described above. First, if no transaction occurs in the interval t, the time evolution filter (TEF) is given by $$f_t(\Delta Q) = \begin{cases} 1 & \text{if } \Delta Q = 0 \\ 0 & \text{otherwise} \end{cases}$$

For a replenishment of inventory of a definite size R that definitely occurs at time t, the TEF is:

$$f_t(\Delta Q) = \begin{cases} 1 & \text{if } \Delta Q = R \\ 0 & \text{otherwise} \end{cases}$$

and for a debit from inventory of a definite size D that definitely occurs at time t, the TEF is:

$$f_t(\Delta Q) = \begin{cases} 1 & \text{if } \Delta Q = -D \\ 0 & \text{otherwise} \end{cases}$$

Note that these functions are independent of the form of the replenishment of debit from inventory. For example, two debits of size D/2 occurring in the same time interval have the same TEF as one of size D.

By introducing uncertainty into the quantity for the replenishment of inventory, a distribution of, for example, P(R), the TEF becomes $$f_t(\Delta Q) = P(\Delta Q)$$

A similar equation results for a debit from inventory.

If replenishment of inventory is certain (that is, the user knows that some quantity of goods will be delivered to the inventory even though there can be some uncertainty on how much will be delivered) the user expects that P(R) will have connected support that is centered on some expected quantity with a relatively small number of non-zero elements. This would satisfy the sparcity condition and allow the convolution to be computed efficiently and directly without resorting to the fft method. If two transactions having TEFs $f$ and g are expected within the same time period, the combined TEF is the convolution $f*g$. If both $f$ and g have connected support, so will the combined TEF.

If there is some non-zero probability, q, that the transaction will not occur, but will have probability distribution over quantity P(R) if it does occur, the TEF is.

$$f_t(\Delta Q) = \begin{cases} (1-q)P(\Delta Q) & \text{if } \Delta Q \neq 0 \\ q + (1-q)P(0) & \text{if } \Delta Q = 0 \end{cases}$$

Typically, this TEF will not have connected support, but will be non-zero both at 0 and in a region around the expected transaction quantity. This will still allow for sparcity considerations but more care must be taken to track the support of the TEF.

If two transactions occur in the same time interval, the TEF divides into four (possibly overlapping) regions: one region for when neither occurs, two regions for when one occurs and not the other, and one region for when both occur. The possibility of multiple transactions occurring in the same time interval complicates the spread of the probability distribution over quantity.

The description above is directed to the situation in which there is no variation allowed in the time of the orders. In the situation in which there is variation in time, a further level of complexity is added. To accommodate the time variation in the probability distribution, generalize the TEF for a single transaction to vary in time as:

$$f_t(\Delta Q) \rightarrow f(t; \Delta Q)$$

Define this function for each transaction to be equal to the TEF for no transaction if t is before the first time at which the transaction can occur as follows:

$$f(t; \Delta Q) = \begin{cases} 1 & \text{if } \Delta Q = 0 \\ 0 & \text{otherwise} \end{cases} \text{ for } t < t_{initial}$$

If t is a time that is equal to or after the final time when the transaction could occur, the TEF is equal to the complete TEF for the transaction (as if there was no time variation) as follows:

$$f(t; \Delta Q) = \begin{cases} (1-q)P(\Delta Q) & \text{if } \Delta Q \neq 0 \\ q + (1-q)P(0) & \text{if } \Delta Q = 0 \end{cases} \text{ for } t \geq t_{final}$$

where q is the probability that the transaction will not occur at all.

For a time t between the initial and final times of the transaction, the variable q is replaced by q(t), the probability that the transaction has not occurred yet by time t. This is derived from the cumulative distribution function for the transaction. In fact, with this definition, this case subsumes both of the others and provides, the general equation:

$$f(t, \Delta Q) = \begin{cases} (1 - q(t))P(\Delta Q) & \text{if } \Delta Q \neq 0 \\ q(t) + (1 - q(t))P(0) & \text{if } \Delta Q = 0 \end{cases}$$

With these definitions in place, the probability distribution at time t is written as follows:

$$P(t) = P(0) * \underset{T \in T}{K} f_T(t)$$

where T is the set of all transactions and $$\underset{T \in T}{K}$$

is the convolution series operator.

If a complete time series is to be computed, a great deal of time can be saved by noting that if a transaction is finished (that is, it is at or past the latest time step at which it could occur) its final TEF can be factored out of all future time steps and need be convolved into the solution only once. Similarly, transactions that have not yet started need not be convolved at all since they are identities. These occurrences can be written as an equation as follows:

$$P(t) = P(0) * \underset{T \in T'}{K} f_T(t) * \underset{T \in T''}{K} f_T(t)$$

where T' and T" are the set of all transactions that have started and finished and the set of transactions that have started and have not finished before time step t respectively. The convolution of the first two factors can be computed progressively throughout the computation and only the third factor need be computed at every time step, which advantageously reduces computation efforts. As such, the algorithm can be written as:

---

P0 ← Initial Probability Vector
for t ← 1 to maxtime
    Pt ← P0
    active ← All transactions active at time t
    for T in active
        Derive $f_T(t)$ at time t
        Pt ← Pt * $f_T(t)$
        if T finishes at time t
            P0 ← P0 * $f_T(t)$

---

The computational complexity of this algorithm depends on several factors, including: (1) n, the number of bins the probability histogram is to be evaluated at for each time; (2) T, the total time duration of the probability distributions for all transactions; (3) m, the number of transactions; and (4) <Q>, the average support length of the quantity distribution for the transactions. Since each transaction is active for a number of time steps equal to the duration of its time distribution, a total of T convolutions with Pt are completed for all transactions. Further, since each transaction is incorporated exactly once into P0, an additional m convolutions are performed.

Each convolution is completed between a vector of average length <Q> and a vector of length n (P0 or Pt) which takes on the order of <Q>n operations. This order of operations is based on assuming: (1) that the single element indicating probability of not happening is inconsequential and can be ignored; (2) that no advantage is taken of possible sparseness of P0 or Pt; and (3) there is no use of a fast Fourier transform technique. If the user assumes that the convolutions are the most computationally intensive operations, the result is a computational order of (T+m)<Q>n.

Recognizing that computation expends time and resources, there are a number of opportunities to speed up the computation of the convolutions. These are described below and can be used in implementations of the detailed model.

The first method of speeding up the computation of the convolutions takes advantage of the typical situation in which: (1) the initial state of the inventory is a definite quantity ($P(Q) = \delta_{Q,Q_0}$) and (2) for at least the first few steps the support of the probability distribution over quantity will be small. Based on these assumptions, it is efficient to track the highest and lowest possible inventories, which can be easily computed, and perform the convolution only over the support of the quantity distribution to avoid wasting innumerable clock cycles multiplying numbers by zero.

If the TEFs have connected support, the support of the distribution will continue to be connected for all time and this will be as efficient as possible. However, if the TEFs fail to have connected support the support of the distribution will become fragmented and there will still be zeros between the upper and lower bounds. An example of TEFs failing to have connected support includes the situation in which there is a non-zero probability of failure. A more thorough elucidation of the support of the distribution that expresses the support as a union of intervals would ameliorate this problem, but the computational effort of keeping track of a potentially exponentially increasing number of intervals and deciding when two intervals overlap to merge them would likely use as much computing resource as it saves.

A second method of speeding up the computation is to have a convolution that checks whether or not an element of the probability distribution is zero before factoring in the convolution. This type of check likely would save many operations in which numbers are multiplied by zero.

A third method of speeding up the computation takes advantage of the associative nature of the convolution operator. In the event that more than one transaction occurs in a time interval, the individual TEFs for each transaction can be applied individually. Because the support of the TEF for a single transaction has at most two components, a sparse representation can be easily used.

A fourth method of speeding up the computation makes a trade off between accuracy and execution time by selecting a number of steps N and a number of points M such that for every N steps, M points are sampled from the distribution and the distribution is replaced with those M points and each M is assigned a probability 1/M. If N=1, this method subsumes the Monte Carlo method of estimating the distribution. Larger Ns represent a compromise between execution time and accuracy because the convolution becomes quicker due to smaller numbers of non-zero points in the quantity distribution.

A fifth method of speeding up the computation uses an alternative approximation method that eliminates small probabilities at each iteration, either by setting a threshold on the smallest probability to be considered or by only keeping the highest N elements for some N. Again, the increase in computation speed results from the faster convolution that is a consequence of having fewer non-zero elements in the quantity distribution.

Any of these five methods of speeding up the computation can be implemented to conserve computation resources. Moreover, one or more of these methods can be combined to further speed up the computation.

In addition to the computation of the probability distribution of inventory over time, it is also necessary to consider appropriate graphical methods to display these results to an end user. There are at least two methods of display: (1) bicumulative display and (2) relative density display.

The bicumulative display method takes the computed probability density function (pdf), sums to form the cumulative distribution function and applies the function $$x \to 2xH\left(\frac{1}{2} - x\right) + 2(1-x)H\left(x - \frac{1}{2}\right)$$

where H is the Heaviside function, to the cumulative distribution function. The result is then plotted as an image intensity with 1 being the darkest and 0 being the lightest. This method has the advantage of highlighting the median value of the distribution, but can disadvantageously hide any multi-modality in the distribution that can result from orders having significant probabilities of cancellation and give a false impression of a single-humped distribution.

The relative density display method uses the PDF only and normalizes at each time step so that the inventory with the largest probability of occurring is assigned a renormalized probability of 1. The function is then displayed as in the bicumulative display. The renormalization ensures that at each time step, there is at least one inventory level shown at the darkest color so that the distribution does not "wash out" as the distribution spreads over time. The relative density display method is more intuitive in that a dark segment of the plot indicates an increased probability of being at that location, and multi-modality is shown as more than one dark region at a single time step. The normalization, however, makes it more difficult to judge differences in probability between time steps, while differences in probability at different inventories at the same time step are easier to judge.

Another aspect of the detailed model that must be considered is the calibration of the confidence bounds that relate to inventory levels. Supply-chain control systems tend to be self-correcting. For example, if inventory levels are too low, new sources of supply will be sought, or some demand will be cancelled or postponed. In fact, the Inventory Early Warning Agent is intended to enhance this process of self-correction. For this reason, it is expected that the confidence bounds of a model that inherently assumes a non-correcting system will be too wide. As such, predicted confidence bounds are corrected through scaling to compensate for the self-correcting nature of the supply-chain control system. To make this correction, histograms of actual variation are compared with histograms of predicted variation, a scaling factor that maximizes their similarity is derived, and that scaling factor is used for future predictions.

There are particular factors that are related to building a model from detailed order data and that must be considered when building the detailed model. These factors include: (1) data sets of different sizes; (2) predictor form; (3) predictor dependence; (4) order splitting/combining; (5) modeling last-minute activities; (6) working with the models to predict variation in individual activities; and (7) incorporating real time demand. One objective in building the model and taking these factors into consideration is to be able to generate a fully automatic system in which different approaches or algorithms can be used and, in particular, can be used without human intervention.

With respect to handling data sets of different sizes, for any particular material, the number of records of replenishment or consumption activities can be extremely large (for example, tens of thousands) or extremely small (for example, two or three). Large quantities of data can require excessive processing time, and small quantities of data can provide insufficient records for learning. Both of these extremes, however, can be adequately handled by applying different techniques based on the size of the data set. For example, if the historical data set is too large, the model can use sampling from the data set. The unused part of the large data set can be later used for validation purposes. If the historical data set for a particular material is too small, it can be extended with records for other materials that involve the same partner or resource. The model can be programmed to, for example, have a threshold that determines whether the data set is too large or too small and automatically samples the data or extends the records, respectively.

The model must also be able to handle activities that have multiple updates. For example, one particular activity can be updated many times before being completed, as in the case of a completion time for providing a good. The completion time can be set initially, and then changed multiple times based on changes in, for example, production schedules and transportation logistics. Each time an activity is updated, a new record for machine learning is generated. If records are considered as independent entries for the model-building algorithms, then activities that are updated multiple times will weigh more heavily than activities that are updated rarely and cause inaccuracies in the model. To compensate for the over-weighing of certain activities, records are weighted by the fraction of time they persist before being updated or fulfilled. The fraction is computed relative to the total time elapsed between when the activity was first planned and when it was completed. Thus all activities will have the same weight, independent of the number of updates.

Predictor variables can be expressed as absolute deviations, percentages, or absolute values. For example, expected variation in quantity can be expressed in terms of units of the variable or in terms of percentage of the order. The learning algorithm of the detailed model can be implemented to construct models that use different forms of the predictor and automatically select the one that performs better at prediction.

Decision trees can only predict a single variable at the time. To predict inventory levels, the detailed model involves the prediction of two or three variables. Since the model will be used to predict actual delivered quantities, actual delivery dates, and completion time spread, one approach is to build separate models, one to predict each of these variables. This approach, however, has the implicit assumption that these variables are independent. Nonetheless, this is one approach that can be implemented in the detailed model. A second approach is to develop a model for one of variables to be predicted, and then use it as a feature in a model for one of the other variables to be predicted. Again, this approach can be implemented in the detailed model. These two approaches imply that there are at least two possible ways to assume dependence.

Some of the activities that relate to inventory management can involve splitting or combining activities. For example, one item, represented as a first activity, can be incorporated into a second item, and the resulting combined item delivered to inventory. Such an activity involves combined activities. As an example of a splitting activity, a product line can make items that are delivered to, for example, the work-in-progress inventory of multiple factories operated by the company. Such an activity involves splitting activities.

If there are split activities, then there is a third predictor, time spread, to be considered when preparing a model of the activities. As an alternative approach in preparing a model, split activities can be treated as separate activities whose characteristics are prorated. Combined activities, on the other hand, can be treated either as single activities that are aggregated, or as independent activities that happened to be delivered at the same time. Each of these methods can be more appropriate in some circumstances than other methods. The Data Collection Agent, described above with respect to obtaining data for constructing the decision trees, will additionally have the task of extracting clean records from the stream of messages pertaining to the splitting and combining activities.

Another source of variability results from orders that are created at the last minute. The Activity Risk Agent must be able to model this type of situation to accurately represent typical supply chains. If there is a record of the four plan dates pertaining to activities (for example, creation date, current date, planned execution date, and actual execution date) then there is sufficient data to work out the probabilities of activities being created at the last minute. Using this information, the Activity Risk Agent can create new activities with the appropriate cancellation probability to represent last-minute orders (for example, the probability of the order being cancelled is equal to one minus the probability of it being created).

As described above, the Activity Risk Agent builds a decision tree that estimates the potential variation in outcome for a particular planned activity. The decision tree can be converted into a set of human-readable rules that can be interpreted and possibly changed by the user. Furthermore, the model-building algorithm used to create the Activity Risk Agent can be "seeded" with known rules about the variation of activities (for example, the user can modify the algorithm to include the condition that shipments of a particular material from a certain supplier arrive within 2 hours of the planned time). Advantages of adding this ability for the user to inspect, change, and seed the learning algorithms are that it gives the user a greater understanding of the system and the ability to enter knowledge that can not be otherwise available.

The features and aspects of the Activity Risk Agent described above do not take into account that variations in downstream demand might have an impact in the timeliness and completeness of the delivery of orders. For example, if downstream demand is high, it is possible that certain orders will be expedited. A difficulty in determining downstream demand results in part from the often significant delay in modern supply chains between when information is generated and when it is actually used. For example, point-of-sales data can come to a decision-maker with a lag of a few days, can have to be aggregated across different sources (stores) and/or times, etc. As a result, the decisions made (for example, new replenishment/manufacturing orders, etc.) can not be reflective of the up-to-date point-of-sales data. This situation is illustrated in the charts in FIGS. 8A and 8B, where changes in the customer demand propagate into orders ("experienced demand") with a time lag of three and ten days, respectively.

The Activity Risk Agent optimally is based on knowledge of the relationship between the real-time end-product demand signal and demand from immediate customers at the location. To obtain this knowledge, a Real-Time Demand Forecast Agent takes the point-of-sales data information immediately when it is generated and evaluates how that will affect future orders. The Real-Time Demand Forecast Agent optionally can evaluate already planned orders to determine whether there are possible changes to the orders. Thus, the Activity Risk Agent uses data obtained from the Real-Time Demand Forecast Agent to forecast orders (or evaluate possibility of changes to planned/forecasted orders) at some future time t', given the current point-of-sales and other data, such as inventory levels, orders already in transition, etc.

In a supply chain, there are a number of scenarios in which the delay between the generation of the point-of-sales data and the actual orders generation can occur in the real-world supply chains and in which the Activity Risk Agent and the Real-Time Demand Forecast Agent can be used. A first scenario is that of a retailer-manufacturer relationship in which orders are placed by a store chain corporate center to a manufacturer. A second scenario is that of a distribution center-manufacturer relationship in which orders are placed by a distribution center to a manufacturer as a result of aggregated/accumulated demand from individual stores. A third scenario is that of a store-distribution center relationship in which orders are placed by an individual store to a distribution center. The third scenario is only relevant if there are time delays in order placement or deliveries between stores and distribution centers.

The information available to the decision maker can differ among the scenarios described above. As such, different algorithms can be prepared that are applicable to all of the above scenarios and other algorithms can be prepared that are better suited to one or two of the scenarios. Examples of these algorithms are described below.

The algorithms each include some common terms, as defined below:

time $t \in \{1, \ldots, T\}$;

$i_t$—inventory at the beginning of period (day) t (measured after this day's shipment arrives);

$x_t$—total demand during the period t (a realization of a random variable);

$s_t$—quantity ordered at the beginning of the period t (after the inventory is measured) to be received after l periods (at the beginning of the period t+l);

$o_t$—items on order as of the beginning of period t (measured after this day shipment arrives); and $a_t$—quantity arrived at the beginning of period t (equals to $s_{t-l}$).

Figure 8A:
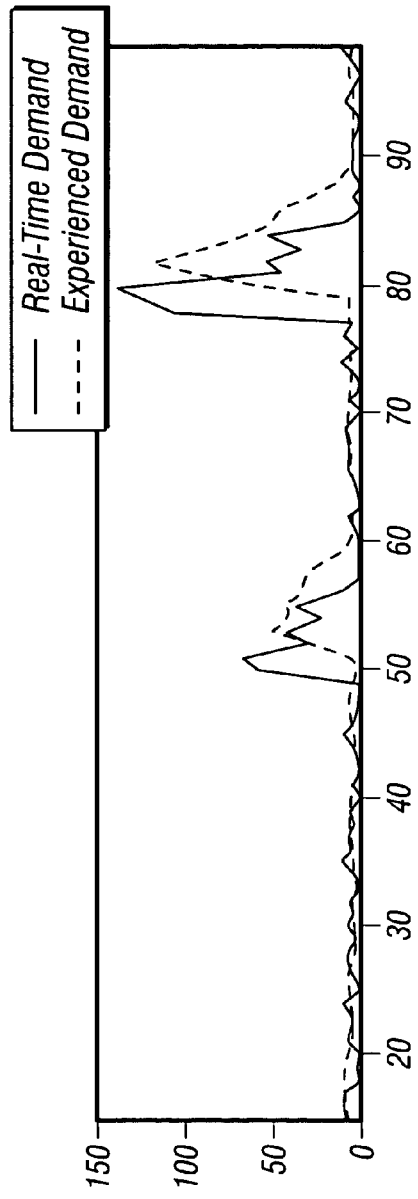
FIG. 8A is a chart showing real-time demand vs. orders with a three-day response time.
Figure 8B:
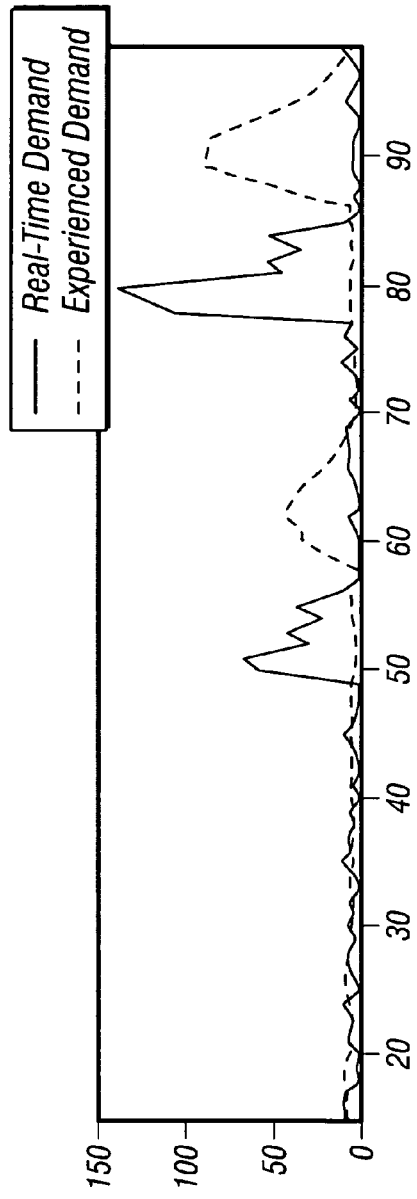
FIG. 8B is a chart showing real-time demand vs. orders with a ten-day response time.

The algorithms formulated below are based on the assumption that future orders are driven by: (1) inventory; (2) sales at time t and at prior times; and (3) by the orders already in the supply chain. The algorithms also assume that there is a built-in time-delay in the existing supply chains (as illustrated in FIGS. 8A and 8B). Because of this time delay, the information set available to a decision maker when placing an order at time t (for example on behalf of a group of stores), consists of the following:

$$I_t^0 = \{\{x_\tau, \tau \leq t - \Delta t_x\}, \{i_\tau, \tau \leq t - \Delta t_i\}, \{s_\tau, \tau \leq t - \Delta t_s\}, \{o_\tau, \tau \leq t - \Delta t_o\}\},$$

where $\Delta t_y$ (assumed to be a positive integer) is the information delay for the variable y.

In contrast with the above assumption of a delay, if it is assumed that the Real-Time Demand Forecast Agent will receive this information with little or no delay at all, the information set for the Real-Time Demand Forecast Agent is expressed as following:

$$I_t^r = \{\{x_\tau, \tau \leq t\}, \{i_\tau, \tau \leq t\}, \{s_\tau, \tau \leq t\}, \{o_\tau, \tau \leq t\}\} \quad (0.15)$$

Therefore, the agent's goal is to "extract" the decision maker's ordering policies from the available data and then to "make" ordering decisions before they are actually made by the decision maker. This ordering policy "extraction" can not always be optimal, as illustrated by the following scenario. Assume that the user, agent, or decision maker attempts at time t to "predict" what order will be placed by a decision maker at time t+Δt. Depending on the exact value of the Δt, the information set available for the estimation of future orders, $I_t^r$, can not contain all the information in the $$I_{t+\Delta t}^r.$$

Therefore, even if the ordering rule was extracted perfectly, the estimate can differ from the actual decision made.

Therefore, one method that can be used is to estimate a set of functions $f_{t+t}(I_t^r), \Delta t \in \{1, \ldots, T\}$, each of which minimizes an appropriately selected distance function d between our approximation and the actual order: $d(f_{t+1}(I_t^r) - o_{t+1})$. The distance minimization criterion of the distance function has been arbitrarily chosen here for simplicity but can be enhanced as necessary.

In developing the functions and Real-Time Demand Forecast Agent to simulate and forecast demand, there is the assumption that the planned/forecasted orders already in the system can be updated (for example, quantity changed, orders cancelled, etc.) when new information becomes available. There also is the assumption that there is a causal relationship between the orders in the near-term future and current point-of-sales data.

In simulating and forecasting demand, it is assumed that there are two separate processes that can be delineated that govern the ordering policy: (1) ordering as a result of experienced consumer demand (and perhaps with the goal of keeping out-of-stocks low) and (2) ordering to stock-up in anticipation of future promotions. Therefore, an order placed at time t can be a composition of orders resulting from both of the above processes. In an actual supply chain, stores receive information about forthcoming promotions (or perhaps make promotional decisions) and can order ahead of time. However, forthcoming promotional information is unlikely to be provided by the agent that obtains the actual data. If this assumption is not correct and information about forthcoming promotions is received, then constructing the model or simulation becomes simpler.

In addition to the assumptions above, there is another assumption made that a store's ordering decisions are aimed at keeping the inventory low, while at the same time not running out of stock. As a result of the above assumptions and equations, the inventory equation can be described as following:

$$i_{t+1} = i_t + a_{t+1} - x_t = i_t - x_t + s_{t+1-l} \quad (0.16)$$

One particular method that stores use to make decisions about the quantity to be ordered at the beginning of the day t is keep the expected inventory at the beginning of the day t+l (after l's day shipment arrives) at a value or level that is equal to the value of the model stock m:

$$s_t = m + f_{t:t+l-1} - o_t - i_t, \quad (0.17)$$

where $f_{t:t+l-1}$ is the expected total consumption in the periods from t to t+l-1.

The value for items on order at time t+1, $o_{t+1}$, can be expressed as follows:

$$o_{t+1} = o_t + s_t - a_{t+1} = o_t + s_t - s_{t+1-l} \quad (0.18)$$

In this idealized example, an amount of goods ordered at a particular time t+1 is a linear combination of an earlier order and sales. Given that actual supply chains can not satisfy the stationary conditions assumed above, then use the assumption that an order at time t+1 can be expressed as a linear combination of point-of-sale, order and inventory levels from previous periods. This provides a basis for using the linear Real-Time-Demand prediction algorithm, described below.

One of the main objectives of supply chain management is to keep the inventory low, while minimizing the out-of-stocks probability at the same time. Because many store ordering policies are based on linear or near linear algorithms, it is reasonable to try a linear regression algorithm for determining S, the quantity ordered as follows:

$$s_{t+k} = \sum_{j=t-l}^{t} \alpha_j i_j + \sum_{j=t-l}^{t} \beta_j x_j + \sum_{j=t-l}^{t} \gamma_j o_j \quad (0.19)$$

In attempting various linear regressions with zero means and including running averages, a value for R-squared was typically obtained with a value of approximately 0.69-0.74. The linear regressions allow for negative predicted order size, which can be problematic because such an order is not possible. Such a problem can be alleviated by running non-negative least squares regression, which has done by using Matlab® functions. A non-negative linear regression has an additional benefit of providing easily interpretable coefficients for the resulting regression. Moreover, the obtained R-squared should be in a similar range as the values noted above.

Figure 8C:
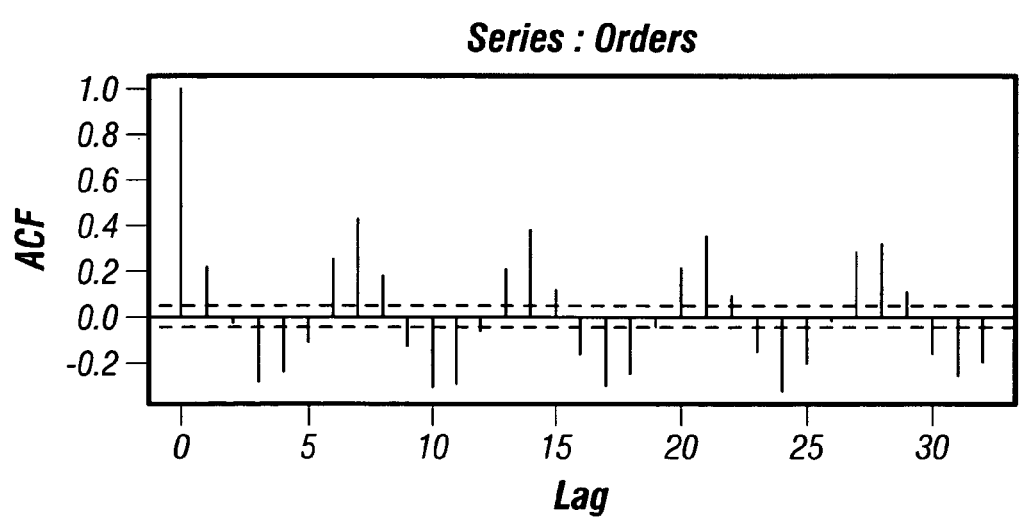
FIG. 8C is a chart showing an auto-correlation function for a time-series of orders.

Another possible method to correlate the supply chain data described above is to assume that the time-series of orders and of other variables is auto-correlated. Such an auto-correlation is illustrated by the orders autocorrelation function for a simulated data set in FIG. 8C. For example, Matlab® and S-Plus® algorithms can be used that will fit a given time-series to an auto-correlated process. As such, the fit can be provided by an auto-correlation or a linear regression.

Other algorithms instead can be used in the model in response to difficulties with the algorithms described above. In particular, one difficulty in implementing the linear regression algorithms is the necessity of taking into account seasonal effects in the consumer demand. For example, the day of the week effect is often pronounced in the real-world supply chains. A classification and regressions decision tree (CART®) algorithm can be used to take such seasonality into account. Otherwise, the set of predictor variables is similar to that described for the linear algorithm above.

Another algorithm that can be used is the cross-correlation method. For example, it is reasonable in formulating the algorithms above to have the expectation that the user will receive updated and reliable point-of-sales data, but can nonetheless fail to receive inventory data that is as reliable. In certain scenarios, such as in a corporate center-manufacturer interaction, this data can not be available on a timely basis. In such a situation, the algorithms that are used can be selected such that they do not take inventory into account at all. One algorithm that is appropriate in such a situation is the cross-correlation method of the instrument function estimation.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. Accordingly, other implementations are within the scope of the following claims.

What is claimed is:

1. A computer-readable storage medium having stored therein instructions, which when executed cause a machine to perform a set of operations comprising:
   interacting with one or more business computers to obtain one of replenishment and consumption activity data related to an inventory;
   creating a model for variations in the inventory;
   using the model to determine estimates of variation for one of currently planned replenishment activities and currently planned consumption activities; and
   using the estimates of variation to predict future inventory levels.

2. The computer-readable storage medium of claim 1, wherein creating the model comprises applying machine learning to create the model.

3. The computer-readable storage medium of claim 1, wherein using the model for variations in inventory comprises using an algorithm including a decision tree.

4. The computer-readable storage medium of claim 3, wherein using the algorithm including a decision tree comprises using a classification and regression tree.

5. The computer-readable storage medium of claim 4, wherein the classification and regression tree is constructed using a growing stage and a pruning stage to provide one or more splitting points.

6. The computer-readable storage medium of claim 5, wherein the growing stage comprises instructions operable to recursively split data using criterion for maximizing the information resulting from each of the one or more splitting points.

7. The computer-readable storage medium of claim 5, wherein the pruning stage comprises instructions operable to remove splitting points.

8. The computer-readable storage medium product of claim 5, wherein the criterion for determining splitting points comprises applying analysis of variance techniques.

9. The computer-readable storage medium of claim 4, wherein a size of the decision tree is selected based on a process comprising instructions operable to:
   determine a data size;
   split data into multiple substantially equal-sized groups;
   construct multiple test decision trees, each test decision tree including all of the groups but one such that test decision trees are created in which each group is excluded once;
   prune each test decision tree at one or more degrees;
   for each degree, test each of the test decision trees by evaluating each test decision tree with the data excluded from creating that test decision tree;
   select a degree of pruning based on a maximization of the average performance for the excluded data; and
   prune the decision tree to the selected degree of pruning.

10. The computer-readable storage medium of claim 1, wherein the model comprises one or more of data relating to: an update number specifying how many times an activity has been updated, a creation date specifying when an activity was first planned, a current date specifying a date when the information in a record was extracted from the activity, an expected date specifying the date at which the activity is expected to be fulfilled, an expected quantity specifying an amount of material required by the activity, source of an order specifying an entity making the order, demand at a source in a temporal window prior to the expected date, actual delivered quantity, actual delivery date, time spread for use with activities that are completed in more than one piece, and activity cancelled information relating to cancellation of an activity.

11. The computer-readable storage medium of claim 10, further comprising instructions that create a model to predict variability on actual delivery quantity.

12. The computer-readable storage medium of claim 10, further comprising instructions that create a model for predicting variability of an actual delivery date.

13. The computer-readable storage medium of claim 1, further comprising instructions that create a model for predicting an order cancellation probability.

14. The computer-readable storage medium of claim 10, further comprising instructions:
determine if a qualitative shift in behavior has occurred; and
if a qualitative shift in behavior has occurred
discard data prior to the qualitative shift in behavior; and
create a decision tree using data generated after the qualitative shift in behavior.

15. The computer-readable storage medium of claim 1, further comprising instructions to process the data based on the quantity of data.

16. The computer-readable storage medium of claim 15, wherein processing the data includes sampling the data if the quantity of the data exceeds a threshold value.

17. The computer-readable storage medium of claim 16, wherein processing the data includes using additional data if the quantity of the data is below a threshold value.

18. The computer-readable storage medium of claim 1, further comprising instructions to display predicted future inventory levels.

19. The computer-readable storage medium of claim 18, further comprising instructions to display the predicted future inventory levels as a bicumulative display.

20. The computer-readable storage medium of claim 18, further comprising instructions to display the predicted future inventory levels as a relative density display.

21. The computer-readable storage medium of claim 1, further comprising instructions for an early warning agent to:
receive predicted future inventory levels; and
use the predicted future inventory levels to determine whether to order additional stock for the inventory.

22. The computer-readable storage medium of claim 1, further comprising instructions to generate the data using a radio-frequency identification device.

23. The computer-readable storage medium of claim 1, further comprising instructions to generate the data based upon the sale of stock in an inventory.

24. The computer-readable storage medium of claim 1, further comprising instructions to generate the data based upon the transfer of stock in an inventory.

25. The computer-readable storage medium of claim 1, wherein the computer-readable storage medium is implemented as one or more agents in a supply chain management system.

26. A system comprising:
a business computer storing one of replenishment and consumption activity data related to an inventory;
an agent computer coupled to the business computer over a network, the agent computer including an agent to interact with the business computer to obtain one of replenishment and consumption activity data related to the inventory, to create a model for variations in the inventory, to sue the model to determine estimates of variation for one of currently planned replenishment activities and currently planned consumption activities and to use the estimates of variation to predict future inventory levels; and
an agent framework to provide framework services to the agent.

27. The system of claim 26, wherein the agent comprises:
an activity risk agent to apply machine learning to create the model.

28. The system of claim 26, wherein using the model for variations in inventory comprises using an algorithm including a decision tree.

29. The system of claim 28, wherein using the algorithm including the decision tree comprises using a classification and regression tree.

30. The system of claim 29, wherein the classification and regression tree is constructed by the agent computers using a growing stage and a pruning stage to provide one or more splitting points.

31. The system of claim 30, wherein the growing stage recursively splits data using criterion for maximizing the information resulting from each of the one or more splitting points.

32. The system of claim 30, wherein the pruning stage removes splitting points.

33. The system of claim 30, wherein the criterion for determining splitting points comprises applying analysis of variance techniques.

34. The system of claim 29, wherein a size of the decision tree is selected based on a process comprising instructions that:
determine a data size; split data into multiple substantially equal-sized groups;
construct multiple test decision trees, each test decision tree including all of the groups but one such that test decision trees are created in which each group is excluded once;
prune each test decision tree at one ore more degrees;
for each degree, test each of the test decision trees by evaluating each test decision tree with the data excluded from creating that test decision tree;
select a degree of pruning based on a maximization of the average performance for the excluded data; and prune the decision tree to the selected degree of pruning.

35. The system of claim 26, wherein the model comprises one or more of data relating to: an update number specifying how many times an activity has been updated, a creation date specifying when an activity was first planned, a current date specifying a date when the information in a record was extracted from the activity, an expected date specifying the date at which the activity is expected to be fulfilled, an expected quantity specifying an amount of material required by the activity, source of an order specifying an entity making the order, demand at a source in a temporal window prior to the expected date, actual delivered quantity, actual delivery date, time spread for use with activities that are completed in more than one piece, and activity cancelled information relating to cancellation of an activity.

36. The system of claim 35, wherein the agent creates another model to predict variability on actual delivery quantity.

37. The system of claim 35, wherein the agent creates another model for predicting variability of an actual delivery date.

38. The system of claim 35, wherein the agent creates another model for predicting an order cancellation probability.

39. The system of claim 26, wherein the agent determines if a qualitative shift in behavior has occurred, and if a qualitative shift in behavior has occurred; discards data prior to the qualitative shift in behavior and creates a decision tree using data generated after the qualitative shift in behavior.

40. The system of claim 26, wherein the agent processes the data based on the quantity of data.

41. The system of claim 40, wherein processing the data includes sampling the data if the quantity of the data exceeds a threshold value.

42. The system of claim 41, wherein processing the data includes using additional data if the quantity of the data is below a threshold value.

43. The system of claim 26, wherein the agent displays predicted future inventory levels.

44. The system of claim 43, wherein the agent displays the predicted future inventory levels as a bicumulative display.

45. The system of claim 43, wherein the agent displays the predicted future inventory levels as a relative density display.

46. The system of claim 26, further comprising:
an early warning agent computer coupled to the agent computer over the network that receives predicted future inventory levels and uses the predicted future inventory levels to determine whether to order additional stock for the inventory.

47. The system of claim 26, further comprising a radio-frequency identification device that generate data.

48. The system of claim 26, wherein the data is generated upon the sale of stock in an inventory.

49. The system of claim 26, wherein the data is generated upon the transfer of stock in an inventory.

50. The system of claim 26, wherein the business and agent computers are implemented in a supply chain management system.

\* \* \* \* \*

UNITED STATES PATENT AND TRADEMARK OFFICE
CERTIFICATE OF CORRECTION

PATENT NO. : 7,644,863 B2  
APPLICATION NO. : 10/281074  
DATED : January 12, 2010  
INVENTOR(S) : Chen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2203 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,644,863 B2 | Page 1 of 1 |
| APPLICATION NO. | : 10/281074 | |
| DATED | : January 12, 2010 | |
| INVENTOR(S) | : Ye Chen and Alexander Renz | |

It is certified that error appears in the above-identified patent and that said Letters Patent is hereby corrected as shown below:

In the Claims, Column 37, line 66, please delete "sue" and insert -- use --.

Signed and Sealed this

Second Day of August, 2011

David J. Kappos
*Director of the United States Patent and Trademark Office*